US012772294B2

(12) United States Patent
Ly et al.

(10) Patent No.: US 12,772,294 B2
(45) Date of Patent: Oct. 20, 2026

(54) TECHNIQUES FOR ADAPTING RANDOM ACCESS TIME-DOMAIN PARAMETERS

(71) Applicant: QUALCOMM Incorporated, San Diego, CA (US)

(72) Inventors: Hung Dinh Ly, San Diego, CA (US); Nazmul Islam, Littleton, MA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 18/443,659

(22) Filed: Feb. 16, 2024

(65) Prior Publication Data

US 2025/0267711 A1 Aug. 21, 2025

(51) Int. Cl.

| | |
|---|---|
| ***H04W 74/0833*** | (2024.01) |
| ***H04L 1/1607*** | (2023.01) |
| ***H04W 74/00*** | (2009.01) |
| ***H04W 74/08*** | (2024.01) |

(52) U.S. Cl.
CPC ....... *H04W 74/0833* (2013.01); *H04L 1/1614* (2013.01); *H04W 74/002* (2013.01); *H04W 74/0866* (2013.01)

(58) Field of Classification Search
None
See application file for complete search history.

(56) References Cited

U.S. PATENT DOCUMENTS

2013/0051325 A1* 2/2013 Ryu .................. H04W 74/0833 370/328
2020/0015180 A1 1/2020 Islam et al.
2020/0146070 A1* 5/2020 Xiong .................. H04L 1/0045
2020/0267764 A1 8/2020 Rastegardoost et al.
2022/0287102 A1* 9/2022 Futaki ..................... H04L 5/001
2022/0338272 A1 10/2022 Ohara et al.
2022/0408478 A1* 12/2022 Christoffersson ............................ H04W 74/0833
2023/0116886 A1* 4/2023 Kim ...................... H04W 16/18 370/328
2023/0171810 A1* 6/2023 Belleschi .......... H04W 74/0833 370/329
2023/0345315 A1* 10/2023 Wu ..................... H04W 36/362
2025/0133524 A1* 4/2025 Prasad ............. H04W 56/0045

OTHER PUBLICATIONS

International Search Report and Written Opinion—PCT/US2025/012823—ISA/EPO—Apr. 14, 2025.

* cited by examiner

*Primary Examiner* — Phirin Sam
(74) *Attorney, Agent, or Firm* — QUALCOMM Incorporated

(57) ABSTRACT

Methods, systems, and devices for wireless communications at a user equipment (UE) are described. A user equipment (UE) may receive first control signaling indicating a random access configuration, the random access configuration including a plurality of time-domain parameters for one or more random access procedures. The UE may receive second control signaling that modifies a subset of the plurality of time-domain parameters indicated in the random access configuration. The UE may transmit a random access message for a random access procedure in accordance with the modified subset of the plurality of time-domain parameters.

28 Claims, 15 Drawing Sheets

300

301

302

303

TECHNIQUES FOR ADAPTING RANDOM ACCESS TIME-DOMAIN PARAMETERS

FIELD OF TECHNOLOGY

The following relates to wireless communications, including techniques for adapting random access time-domain parameters.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). In some wireless communications systems, a wireless device may perform a random access procedure. However, such approaches may be improved.

SUMMARY

The described techniques relate to improved methods, systems, devices, and apparatuses that support techniques for adapting random access time-domain parameters. For example, a user equipment (UE) may receive control signaling indicating a random access configuration (e.g., a random access channel (RACH) configuration), where the random access configuration includes a plurality of time-domain parameters for one or more random access procedures. The UE may receive additional control signaling that modifies a subset of the plurality of time-domain parameters indicated in the random access configuration. For example, the subset of time-domain parameters that are modified by the additional control signaling may include a random access configuration periodicity, a subframe number associated with the random access configuration, a quantity of random access slots within a subframe, a quantity of time-domain random access occasions within a slot, or any combination thereof. The UE may transmit a random access message for a random access procedure in accordance with the modified subset of the plurality of time-domain parameters. Such techniques may improve various aspects of system efficiency, including enhanced power saving and latency for wireless devices.

A method for wireless communications by a user equipment (UE) is described. The method may include receiving first control signaling indicating a random access configuration, the random access configuration including a set of multiple time domain parameters for one or more random access procedures, receiving second control signaling that modifies a subset of the set of multiple time domain parameters indicated in the random access configuration, and performing a random access procedure in accordance with the modified subset of the set of multiple time domain parameters.

A UE for wireless communications is described. The UE may include one or more memories storing processor executable code, and one or more processors coupled with the one or more memories. The one or more processors may individually or collectively be operable to execute the code to cause the UE to receive first control signaling indicating a random access configuration, the random access configuration including a set of multiple time domain parameters for one or more random access procedures, receive second control signaling that modifies a subset of the set of multiple time domain parameters indicated in the random access configuration, and perform a random access procedure in accordance with the modified subset of the set of multiple time domain parameters.

Another UE for wireless communications is described. The UE may include means for receiving first control signaling indicating a random access configuration, the random access configuration including a set of multiple time domain parameters for one or more random access procedures, means for receiving second control signaling that modifies a subset of the set of multiple time domain parameters indicated in the random access configuration, and means for performing a random access procedure in accordance with the modified subset of the set of multiple time domain parameters.

A non-transitory computer-readable medium storing code for wireless communications is described. The code may include instructions executable by one or more processors to receive first control signaling indicating a random access configuration, the random access configuration including a set of multiple time domain parameters for one or more random access procedures, receive second control signaling that modifies a subset of the set of multiple time domain parameters indicated in the random access configuration, and perform a random access procedure in accordance with the modified subset of the set of multiple time domain parameters.

In some examples of the method, user equipment (UEs), and non-transitory computer-readable medium described herein, receiving the second control signaling may include operations, features, means, or instructions for receiving the second control signaling including an indication that one or more time domain resources for performing the one or more random access procedures indicated via the random access configuration may be to be disregarded by the UE, where the random access procedure may be performed via time domain resources that may be different from the one or more time domain resources to be disregarded by the UE.

Some examples of the method, user equipment (UEs), and non-transitory computer-readable medium described herein may further include operations, features, means, or instructions for receiving, via the second control signaling, an indication of a scaling factor associated with a random access resource periodicity indicated in the random access configuration, where the indication that the one or more time domain resources may be to be disregarded may be based on the scaling factor.

Some examples of the method, user equipment (UEs), and non-transitory computer-readable medium described herein may further include operations, features, means, or instructions for receiving, via the second control signaling, an indication of a bitmap indicating one or more sub-frames in which the one or more time domain resources that may be to be disregarded by the UE may be located.

Some examples of the method, user equipment (UEs), and non-transitory computer-readable medium described herein may further include operations, features, means, or instructions for receiving, via the second control signaling, an indication of one or more slots in which the one or more time domain resources that may be to be disregarded by the UE may be located.

Some examples of the method, user equipment (UEs), and non-transitory computer-readable medium described herein may further include operations, features, means, or instructions for receiving, via the second control signaling, an indication of one or more random access occasions in which the one or more time domain resources that may be to be disregarded by the UE may be located.

In some examples of the method, user equipment (UEs), and non-transitory computer-readable medium described herein, the one or more time domain resources that may be to be disregarded by the UE include one or more random access slots that occur first in time in a special slot of a frame or one or more random access occasions that occur first in time in a random access slot of one of the one or more random access slots.

In some examples of the method, user equipment (UEs), and non-transitory computer-readable medium described herein, receiving the second control signaling may include operations, features, means, or instructions for receiving the second control signaling including an indication of one or more additional time domain resources for performing the random access procedure relative to time domain resources indicated in the random access configuration, where the random access procedure may be performed using at least one of the one or more additional time domain resources.

In some examples of the method, user equipment (UEs), and non-transitory computer-readable medium described herein, receiving the second control signaling may include operations, features, means, or instructions for receiving the second control signaling including an indication of an additional random access configuration index corresponding to an additional random access configuration that corresponds to one or more modified values for the subset of the set of multiple time domain parameters indicated in the random access configuration.

In some examples of the method, user equipment (UEs), and non-transitory computer-readable medium described herein, receiving the second control signaling may include operations, features, means, or instructions for receiving the second control signaling including an indication of one or more modified values for the subset of the set of multiple time domain parameters indicated in the random access configuration.

In some examples of the method, user equipment (UEs), and non-transitory computer-readable medium described herein, the second control signaling includes an indication of a scaling parameter applicable to a random access occasion periodicity parameter indicated via the random access configuration and a random access association periodicity parameter indicated via the random access configuration.

Some examples of the method, user equipment (UEs), and non-transitory computer-readable medium described herein may further include operations, features, means, or instructions for receiving a set of multiple additional random access configurations corresponding to a set of multiple UE features, or a set of multiple UE functionalities, or both and receiving an indication of one or more of the set of multiple additional random access configurations to which the modified subset of the set of multiple time domain parameters may be applicable.

In some examples of the method, user equipment (UEs), and non-transitory computer-readable medium described herein, the indication of one or more of the set of multiple additional random access configurations to which the modified subset may be applicable includes a bitmap and respective bits of the bitmap may be mapped to respective UE features of the set of multiple UE features or respective UE functionalities of the set of multiple UE functionalities.

In some examples of the method, user equipment (UEs), and non-transitory computer-readable medium described herein, the subset of the set of multiple time domain parameters includes a periodicity parameter, a subframe number parameter, a quantity of random access slots within a subframe, a quantity of random access occasions within a random access slot, or any combination thereof.

In some examples of the method, user equipment (UEs), and non-transitory computer-readable medium described herein, the first control signaling includes system information block signaling or radio resource control signaling.

In some examples of the method, user equipment (UEs), and non-transitory computer-readable medium described herein, the second control signaling includes paging downlink control information signaling, paging message signaling, paging early indication signaling, downlink control information signaling, or scheduling downlink control information signaling.

A method for wireless communications by a network entity is described. The method may include outputting first control signaling indicating a random access configuration, the random access configuration including a set of multiple time domain parameters for one or more random access procedures, outputting second control signaling that modifies a subset of the set of multiple time domain parameters indicated in the random access configuration, and performing a random access procedure in accordance with the modified subset of the set of multiple time domain parameters.

A network entity for wireless communications is described. The network entity may include one or more memories storing processor executable code, and one or more processors coupled with the one or more memories. The one or more processors may individually or collectively be operable to execute the code to cause the network entity to output first control signaling indicating a random access configuration, the random access configuration including a set of multiple time domain parameters for one or more random access procedures, output second control signaling that modifies a subset of the set of multiple time domain parameters indicated in the random access configuration, and perform a random access procedure in accordance with the modified subset of the set of multiple time domain parameters.

Another network entity for wireless communications is described. The network entity may include means for outputting first control signaling indicating a random access configuration, the random access configuration including a set of multiple time domain parameters for one or more random access procedures, means for outputting second control signaling that modifies a subset of the set of multiple time domain parameters indicated in the random access configuration, and means for performing a random access procedure in accordance with the modified subset of the set of multiple time domain parameters.

A non-transitory computer-readable medium storing code for wireless communications is described. The code may include instructions executable by one or more processors to output first control signaling indicating a random access configuration, the random access configuration including a set of multiple time domain parameters for one or more random access procedures, output second control signaling that modifies a subset of the set of multiple time domain parameters indicated in the random access configuration, and perform a random access procedure in accordance with the modified subset of the set of multiple time domain parameters.

In some examples of the method, network entities, and non-transitory computer-readable medium described herein, outputting the second control signaling may include operations, features, means, or instructions for outputting the second control signaling including an indication that one or more time domain resources for performing the one or more random access procedures indicated via the random access configuration may be to be disregarded by the UE, where the random access procedure may be performed via time domain resources that may be different from the one or more time domain resources to be disregarded by the UE.

Some examples of the method, network entities, and non-transitory computer-readable medium described herein may further include operations, features, means, or instructions for outputting, via the second control signaling, an indication of a scaling factor associated with a random access resource periodicity indicated in the random access configuration, where the indication that the one or more time domain resources may be to be disregarded may be based on the scaling factor.

Some examples of the method, network entities, and non-transitory computer-readable medium described herein may further include operations, features, means, or instructions for outputting, via the second control signaling, an indication of a bitmap indicating one or more sub-frames in which the one or more time domain resources that may be to be disregarded by the UE may be located.

Some examples of the method, network entities, and non-transitory computer-readable medium described herein may further include operations, features, means, or instructions for outputting, via the second control signaling, an indication of one or more slots in which the one or more time domain resources that may be to be disregarded by the UE may be located.

Some examples of the method, network entities, and non-transitory computer-readable medium described herein may further include operations, features, means, or instructions for outputting, via the second control signaling, an indication of one or more random access occasions in which the one or more time domain resources that may be to be disregarded by the UE may be located.

In some examples of the method, network entities, and non-transitory computer-readable medium described herein, the one or more time domain resources that may be to be disregarded by the UE include one or more random access slots that occur first in time in a special slot of a frame or one or more random access occasions that occur first in time in a random access slot of one of the one or more random access slots.

In some examples of the method, network entities, and non-transitory computer-readable medium described herein, outputting the second control signaling may include operations, features, means, or instructions for outputting the second control signaling including an indication of one or more additional time domain resources for performing the random access procedure relative to time domain resources indicated in the random access configuration, where the random access procedure may be performed using at least one of the one or more additional time domain resources.

In some examples of the method, network entities, and non-transitory computer-readable medium described herein, outputting the second control signaling may include operations, features, means, or instructions for outputting the second control signaling including an indication of an additional random access configuration index corresponding to an additional random access configuration that corresponds to one or more modified values for the subset of the set of multiple time domain parameters indicated in the random access configuration.

In some examples of the method, network entities, and non-transitory computer-readable medium described herein, outputting the second control signaling may include operations, features, means, or instructions for outputting the second control signaling including an indication of one or more modified values for the subset of the set of multiple time domain parameters indicated in the random access configuration.

In some examples of the method, network entities, and non-transitory computer-readable medium described herein, the second control signaling includes an indication of a scaling parameter applicable to a random access occasion periodicity parameter indicated via the random access configuration and a random access association periodicity parameter indicated via the random access configuration.

Some examples of the method, network entities, and non-transitory computer-readable medium described herein may further include operations, features, means, or instructions for outputting a set of multiple additional random access configurations corresponding to a set of multiple UE features, or a set of multiple UE functionalities, or both and outputting an indication of one or more of the set of multiple additional random access configurations to which the modified subset of the set of multiple time domain parameters may be applicable.

In some examples of the method, network entities, and non-transitory computer-readable medium described herein, the indication of one or more of the set of multiple additional random access configurations to which the modified subset may be applicable includes a bitmap and respective bits of the bitmap may be mapped to respective UE features of the set of multiple UE features or respective UE functionalities of the set of multiple UE functionalities.

In some examples of the method, network entities, and non-transitory computer-readable medium described herein, the subset of the set of multiple time domain parameters includes a periodicity parameter, a subframe number parameter, a quantity of random access slots within a subframe, a quantity of random access occasions within a random access slot, or any combination thereof.

In some examples of the method, network entities, and non-transitory computer-readable medium described herein, the first control signaling includes system information block signaling or radio resource control signaling.

In some examples of the method, network entities, and non-transitory computer-readable medium described herein, the second control signaling includes paging downlink control information signaling, paging message signaling, paging early indication signaling, downlink control information signaling, or scheduling downlink control information signaling.

DETAILED DESCRIPTION

In wireless communications, a user equipment (UE) may establish communication with one or more network entities through a random access procedure. However, in some approaches, operation of the network entities, including activating radio frequency (RF) components for such random access procedures (e.g., to monitor for random access preambles from one or multiple UEs), may result in excessive power consumption. As such, approaches for reducing power consumption while maintaining communications reliability, quality, and low latency may be desirable.

Techniques for dynamically modifying time-domain related parameters in random access configurations may be employed. For example, a UE may receive first control signaling (e.g., system information block (SIB) signaling or radio resource control (RRC) signaling) that may indicate a random access configuration (e.g., a random access channel (RACH) configuration, a RACH configuration index) that includes one or more time-domain parameters. The UE may receive second control signaling that may modify at least a subset of the one or more time-domain parameters, including periodicity parameters, subframe number parameters, random access slot quantity parameters, random access occasion quantity parameters, or any combination thereof. In some examples, the second control signaling may indicate additional time-domain resources (e.g., relative to the configuration signaled via the first control signaling) that are to be available for random access procedure operations. Additionally, or alternatively, the second control signaling may indicate one or more time-domain resources indicated in the first control signaling that the UE is to disregard or consider as unavailable for random access procedure operations (e.g., relative to the configuration signaled via the first control signaling). In this way, power consumption at one or more network entities may be reduced while performing effective random access operations and maintaining communications reliability, communications quality, and communications latency considerations.

Aspects of the disclosure are initially described in the context of wireless communications systems. Aspects of the disclosure are then described with reference to a wireless communications system, random access schemes, and a process flow. Aspects of the disclosure are further illustrated by and described with reference to apparatus diagrams, system diagrams, and flowcharts that relate to techniques for adapting random access time-domain parameters.

Figure 1:
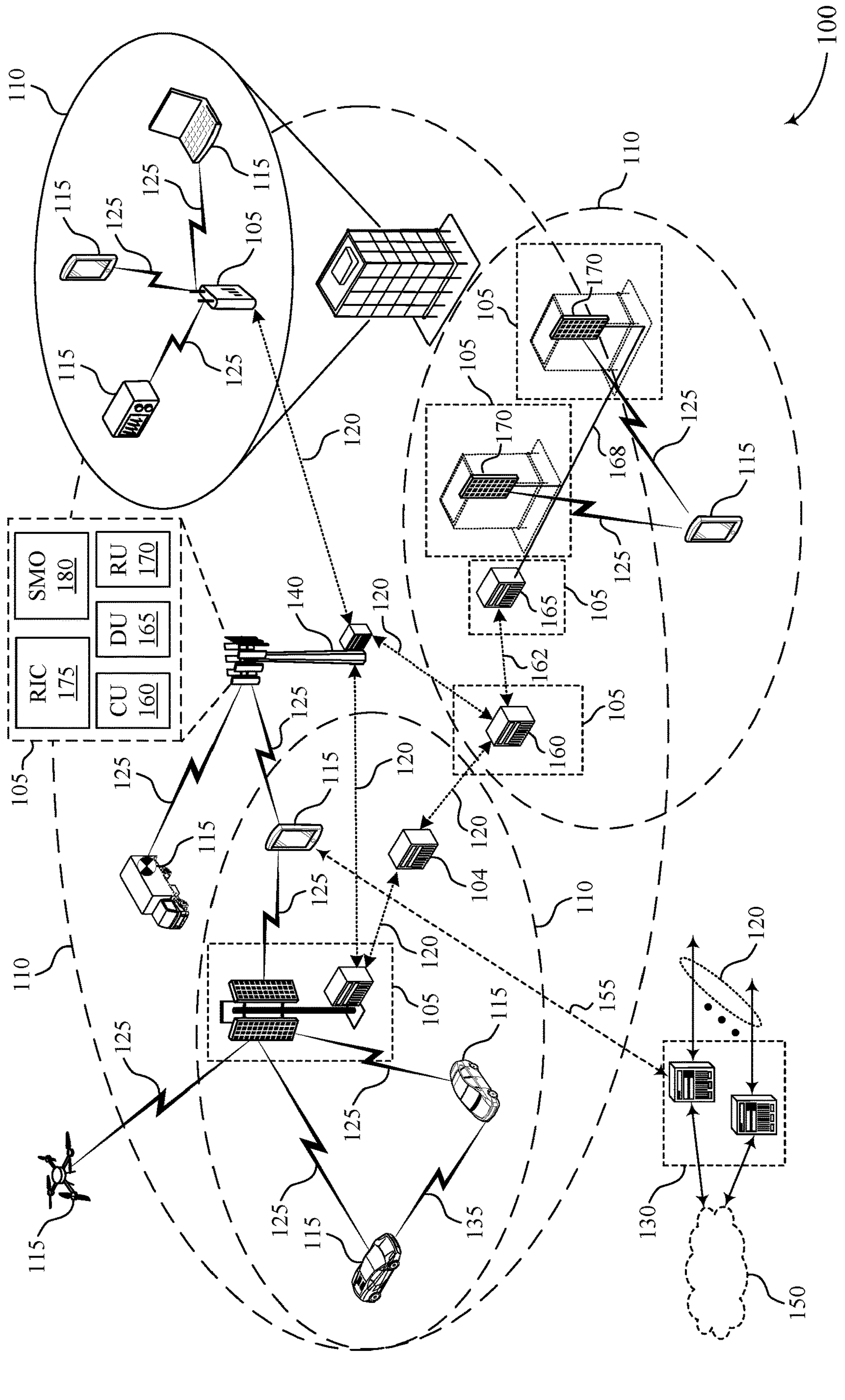
FIG. 1 shows an example of a wireless communications system that supports techniques for adapting random access time-domain parameters.

FIG. 1 shows an example of a wireless communications system 100 that supports techniques for adapting random access time-domain parameters. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

A UE 115 attempting to access a wireless network may perform an initial cell search by detecting a primary synchronization signal (PSS) from a network entity 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. In some cases, a network entity 105 may transmit synchronization signals (e.g., PSS, SSS, and the like) using multiple beams in a beam-sweeping manner through a cell coverage area. In some cases, PSS, SSS, and/or broadcast information (e.g., a physical broadcast channel (PBCH)) may be transmitted within different synchronization signal blocks (SSBs) on respective directional beams, where one or more SSBs may be included within a burst.

After receiving the PSS and SSS, the UE 115 may receive a MIB, which may be transmitted in the PBCH. The MIB may contain system bandwidth information, an SFN, among other parameters. After decoding the MIB, the UE 115 may receive one or more SIBs. For example, SIB1 may contain cell access parameters and scheduling information for other SIBs. Decoding SIB1 may enable the UE 115 to receive SIB2. SIB2 may contain RRC configuration information related to RACH procedures, paging, PUCCH, PUSCH, power control, SRS, and the like. After completing initial cell synchronization, a UE 115 may decode the MIB, SIB1, and SIB2 prior to accessing the network. The MIB may be transmitted on PBCH and may, for example, utilize the first 4 OFDMA symbols of the second slot of the first subframe of each radio frame, and the MIB may use the middle 6 RBs (72 subcarriers) in the frequency domain. After receiving the MIB, a UE 115 may receive one or more SIBs. Different SIBs may be defined according to the type of system information conveyed. In some examples, a new SIB1 may be transmitted in the fifth subframe of every eighth frame (SFN mod 8=0) and rebroadcast every other frame (20 ms). SIB1 includes access information, including cell identity information. SIB1 may also include cell selection information (or cell selection parameters), among other information. Additionally, SIB1 may include scheduling information for other SIBs. For example, SIB2 may be scheduled dynamically according to information in SIB1, and SIB2 may include access information and parameters related to common and shared channels.

The UE 115 may transmit a RACH preamble to a network entity 105. For example, the RACH preamble may be randomly selected from a set of 64 predetermined sequences. This may enable the network entity 105 to distinguish between multiple UEs 115 trying to access the system simultaneously. The network entity 105 may respond with a random access response that provides an uplink resource grant, a timing advance, and a temporary C-RNTI. The UE 115 may then transmit an RRC connection request along with a TMSI (if the UE 115 has previously been connected to the same wireless network) or a random identifier. The RRC connection request may also indicate the reason the UE 115 is connecting to the network (e.g., emergency, signaling, data exchange, etc.). The network entity 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble. In some aspects, a UE 115 may perform either a two-step RACH procedure or a four-step RACH procedure.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, the wireless communications system 100, and a UE 115 and a network entity 105, may support modification of one or more aspects of a random access configuration. For example, a network entity 105 may transmit a random access configuration that may indicate one or more parameters for performing the random access procedure. The network entity 105 may transmit one or more indications of modifications to at least a subset of the parameters for performing the random access procedure. For example, the network entity 105 may modify periodicity parameters, subframe number parameters, random access slot quantity parameters, random access occasion quantity parameters, one or more other parameters, or any combination thereof, via additional control signaling sent to the UE 115. In this way, power consumption at one or more network entities may be reduced while maintaining effective random access procedures, thereby maintaining or improving communications reliability and quality, and maintaining or reducing communications latency.

Figure 2:
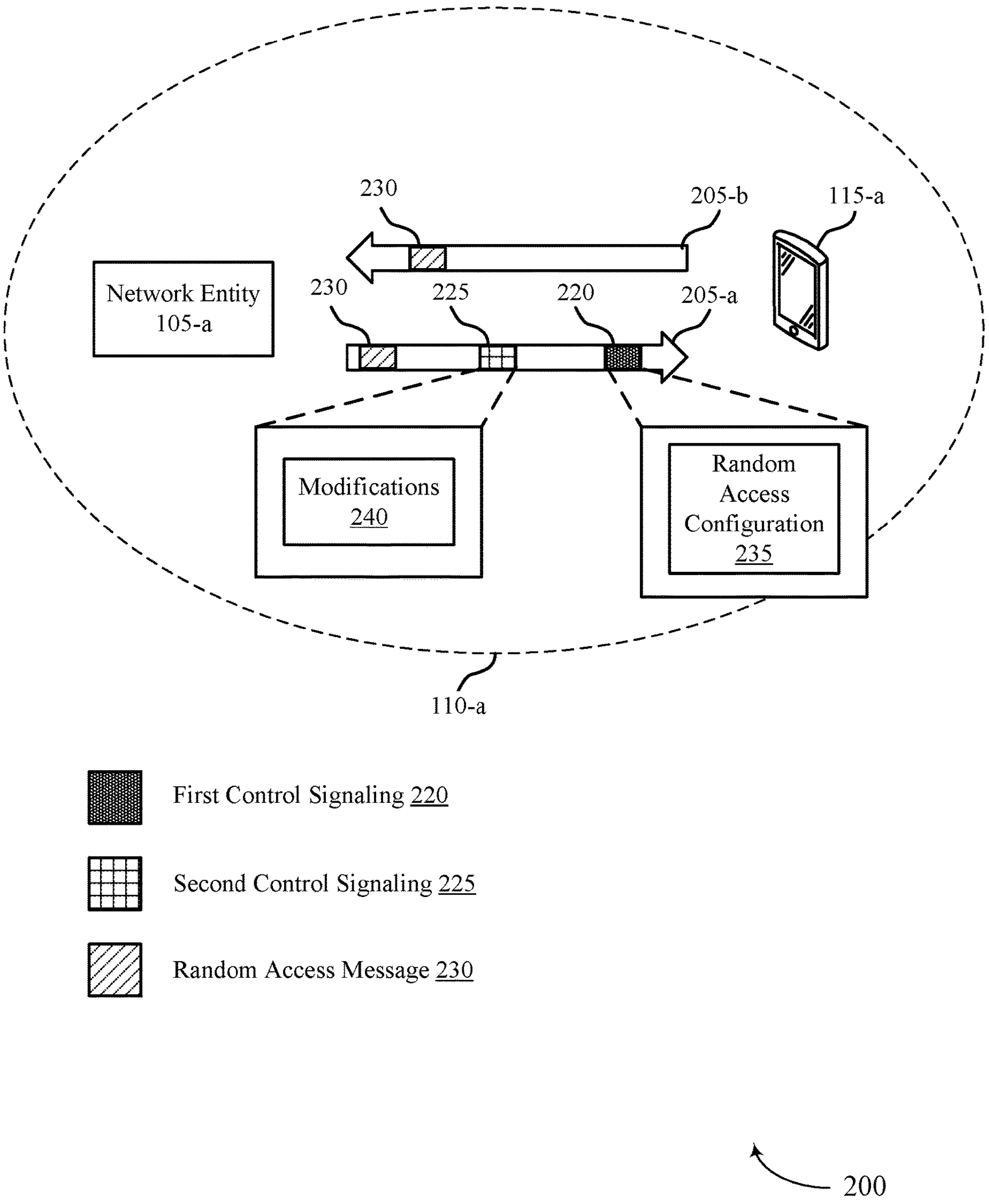
FIG. 2 shows an example of a wireless communications system that supports techniques for adapting random access time-domain parameters.

FIG. 2 shows an example of a wireless communications system 200 that supports techniques for adapting random access time-domain parameters. The wireless communications system 200 may include the network entity 105-*a*, which may be an example of one or more network entities discussed in relation to other figures. The wireless communications system 200 may include the UE 115-*a*, which may be an example of UEs discussed in relation to other figures. In some examples, the UE 115-*a* may be located in a geographic coverage area 110-*a* that may be associated with the network entity 105-*a*. The network entity 105-*a* and UE 115-*a* may communicate via one or more downlink communication links 205-*a* and one or more uplink communication links 205-*b*.

In wireless communications system 200, a UE 115-*a* and a network entity 105-*a* may perform a random access procedure (e.g., a RACH procedure, a physical random access channel (PRACH) procedure). In some examples, to facilitate performing such procedures, the network entity 105-*a* may transmit a random access configuration (e.g., the random access configuration 235) to the UE 115-*a*, according to which the UE 115-*a* may perform the random access procedure. Such a random access configuration 235 may include or indicate one or more parameters, including one or more preamble format parameters, one or more periodicity parameters, one or more subframe number parameters, one or more starting symbol parameters, one or more random access slot quantity parameters, one or more random access occasion quantity parameters, one or more random access duration parameters, or any combination thereof. In some examples, some random access formats may include one or more additional parameters or exclude one or more parameters. Such a random access configuration 235 may be identified by or otherwise associated with an index that may facilitate indication of such random access configurations 235. Here, respective random access configuration indices may each be associated with one or more different parameters used by the UE 115-*a* to perform the random access procedure.

In some examples, different random access configurations 235 may be used for different types of UEs, such as "legacy" UEs, reduced capability (RedCap) UEs, one or more other UEs, or any combination thereof. Additionally, or alternatively, different random access configurations 235 may be used in connection with varied capabilities of UEs, including small data transmission (SDT) operations, random access message (e.g., Msg3) repetition, one or more other capabilities, or any combination thereof. In some examples, the network entity 105 may configure multiple random access configurations to support various types of UEs, various types of UE capabilities, or any combination thereof.

However, in some examples, the network entity 105 or multiple such network entities 105 may consume excessive amounts of power in operations, including random access operations. As such, the techniques herein may reduce power consumption of one or more network entities 105, while still maintaining effective operations, including random access procedures.

For example, the network entity 105-*a*, the UE 115-*a*, or both, may dynamically adapt a subset of parameters (e.g., via the second control signaling 225 that includes or indicates the modifications 240) that are included in the random access configuration 235 included or indicated in the first control signaling 220. In some examples, the random access configuration 235 may be configured or indicated in a system information block (SIB) (such as SIB1 or in other control signaling, such as RRC signaling). In some examples, a UE may perform a random access procedure in a cell that may not support the transmission of an SIB. In such cases, the UE 115-*a* may receive RRC signaling as the first control signaling 220. Such a subset of parameters (e.g., time-domain parameters) that may be dynamically adapted or modified may include one or more periodicity parameters, one or more subframe number parameters, one or more random access slot quantity parameters, one or more random access occasion quantity parameters, or any combination thereof. In some examples, such dynamic adaptation of parameters (e.g., included in or indicated by the modifications 240) may be indicated via the second control signaling 225, which may, in some cases, be paging control information (e.g., paging DCI) transmission, one or more paging messages, one or more paging early indications (PEIs), one or more dedicated control information transmissions (e.g., one or more dedicated DCI transmissions), one or more scheduling DCI transmissions, other control signaling, or any combination thereof. For example, the use of scheduling DCI transmissions may be supported in cases in which random access adaptations (e.g., PRACH adaptations) are performed in an SCell. In such cases, the network entity 105-*a* may transmit an adaptation indication from a scheduling DCI (e.g., for uplink shared channel communications or downlink shared channel communications) that may be transmitted from another cell (e.g., a PCell).

After the various modifications 240 to the parameters or values of the random access configuration 235 have been received by the UE 115-*a*, the UE 115-*a* and the network entity 105-*a* may perform a random access procedure. In such a random access procedure, the UE 115-*a* and the network entity 105-*a* may transmit one or more random access messages 230.

FIGS. 3A, 3B, 3C, and 3D show examples of random access schemes, including random access scheme 300, random access scheme 301, random access scheme 302, and random access scheme 303, that support techniques for adapting random access time-domain parameters.

Figure 3A:
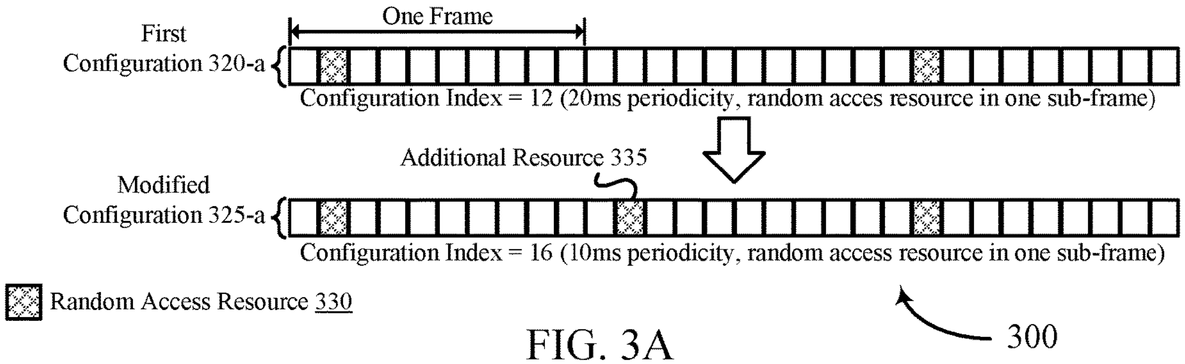
FIGS. 3A, 3B, 3C, and 3D show examples of random access schemes that support techniques for adapting random access time-domain parameters.

FIG. 3A depicts a random access scheme 300. In the random access scheme 300, the first configuration 320-*a* may include time-domain random access information with random access resources 330 that be considered to be relatively sparse. In some examples, the first configuration 320-*a* may be transmitted or indicated in a SIB, such as SIB1, which may be updated relatively infrequently. As such, in some cases, a network entity may transmit one or more indications of modifications to be made to one or more parameters (e.g., time-domain parameters) of the first configuration 320-*a*, effectively resulting in a modified configuration 325-*a*. In some examples, the modified configuration 325-*a* is not a configuration transmitted from the network entity, but may be the state of the first configuration 320-*a* after accounting for the modifications received from the network entity. However, in some examples, the modified configuration 325-*a* may be a configuration received or indicated by the network entity.

In some examples, the network entity may transmit the first configuration 320-*a* or an indication thereof by transmitting an index associated with the first configuration 320-*a*. For example, as depicted, the first configuration 320-*a* may be associated with an index (e.g., a PRACH configuration index) of 12. This index of 12 may allow the UE to determine or otherwise obtain the random access parameters that are associated with the first configuration 320-*a*. The network entity may further transmit or indicate a different configuration index (e.g., a PRACH configuration index of 16, as depicted) to indicate the modifications or adaptations to random access operations that the UE is to perform. For example, the network entity may indicate such an index in control signaling (e.g., the second control signaling 225) that is transmitted after transmission of the initial random access configuration (e.g., in the first control signaling 220). In some examples, the different configuration (e.g., the modified configuration 325-*a*) that is associated with the different configuration index (e.g., 16) may be associated with one or more values for random access parameters that are different than those values that may be associated with the initially transmitted configuration (e.g., the first configuration 320-*a*).

In some examples, in the modified configuration 325-*a*, a UE may be provided with an additional random access resource 335 or multiple such additional random access resources 335 beyond those resources initially configured or indicated in the first configuration 320-*a*. Such additional random access resources 335 may be indicated through one or more modified parameters, including one or more random access periodicity parameters, one or more time-domain resource allocation parameters, one or more sub-frame number parameters, one or more random access slot parameters (e.g., for one or more slots in an indicated sub-frame), one or more random access occasion parameters (e.g., for one or more occasions in an indicated slot), or any combination thereof.

In some examples, the additional resource 335 may be indicated as only being partially available for performing a random access procedure. For example, the additional resource 335 may include or correspond with multiple random access occasions. One or more of the multiple random access occasions may be indicated as available for performing a random access procedure, whereas one or more others of the multiple random access occasions may be indicated as unavailable for performing the random access procedure. Such indications of availability or unavailability may be indicated using the same methods by which that entire resources may be indicated as available or unavailable (e.g., through control signaling, indications of a configuration index, modifications to a configuration associated with a configuration index, one or more other techniques described herein, or any combination thereof).

In some examples, a network entity may indicate the modified configuration 325-*a* to the UE in a variety of ways (e.g., by employing one or more techniques as described herein). However, in some examples, the modified configuration 325-*a* may correspond with another configuration that would be valid for use by the UE (e.g., the modified configuration 325-*a* may include the same parameters or compatible parameters as compared to the parameters of the first configuration 320-*a*). For example, given a list of possible configurations, it may be the case that a subset of such configurations may be compatible or permitted for use by the UE. The first configuration 320-*a* may be one of these compatible or permitted configurations, and the modification of the first configuration 320-*a* (e.g., be it through indication of a configuration index, modification of one or more parameters through indication of such parameters, associated values, or both, or any combination thereof) may result in the modified configuration 325-*a* being the same as or corresponding with one of the subset of compatible or permitted configurations. Such operations and considerations may apply to any modification of configurations (e.g., adding resources, muting resources, other modifications, or any combination thereof) described herein.

Figure 3B:
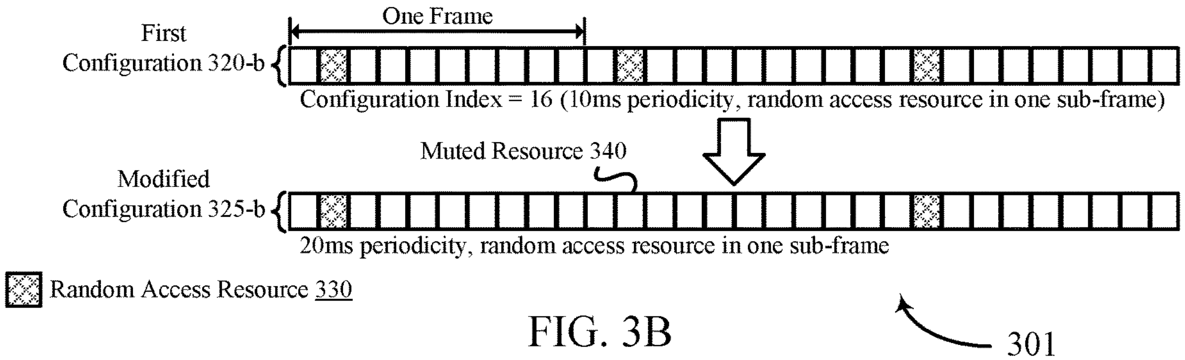

FIG. 3B depicts a random access scheme 301. In the random access scheme 301, the first configuration 320-*b* may include random access resources 330 that may be relatively densely scheduled. In some examples, the first configuration 320-*b* may be transmitted or indicated in a SIB, such as SIB1, which may be updated relatively infrequently. As such, in some cases, a network entity may transmit one or more indications of modifications to be made to one or more parameters of the first configuration 320-*b*, effectively resulting in a modified configuration 325-*b*. In some examples, the modified configuration 325-*b* is not a configuration transmitted from the network entity, but may be the state of the first configuration 320-*b* after taking into account the modifications (e.g., modifications to one or more time-domain parameters) indicated by the network entity. However, in some examples, the modified configuration 325-*b* may be a configuration received or indicated by the network entity.

In some examples, the network entity may transmit the first configuration 320-*b* or an indication thereof by transmitting an index (e.g., a PRACH configuration index) associated with the first configuration 320-*b*. For example, as depicted, the first configuration 320-*b* may be associated with an index of 12. This index of 12 may allow the UE to determine or otherwise obtain the random access parameters that are associated with the first configuration 320-*b*. The network entity may further transmit or indicated one or more modifications to values of one or more random access parameters in the first configuration 320-*b* to produce the modified configuration 325-*b*. Such an approach may be in contrast to the example provided in relation to the first configuration 320-*a* and the modified configuration 325-*a*, in which a different configuration index was transmitted. Here, the network entity may directly transmit or indicate values of random access parameters that are to be modified. In some examples, such values may correspond with values that may be present in other configurations or the values may be values that do not appear in other configurations.

In some examples, the modified configuration 325-*b* may be subject to a resource muting pattern that may "mute" one or more resources indicated in the first configuration 320-*b*. Such "muting" may include disregarding the resource as available for random access communications or for any communications, directly indicating the resource as unavailable, one or more other techniques for "muting" the resource, or any combination thereof.

For example, the modified configuration 325-*b* may include the muted resource 340. The muted resource 340 may have been indicated in the first configuration 320-*b* as a random access resource but was indicated as being subject to the muting pattern and, as such, is not considered or interpreted to be a random access resource 330 in the modified configuration 325-*b* (e.g., the UE would not consider the muted resource 340 to be an available resource for performing a portion or all of a random access procedure).

Figure 3C:
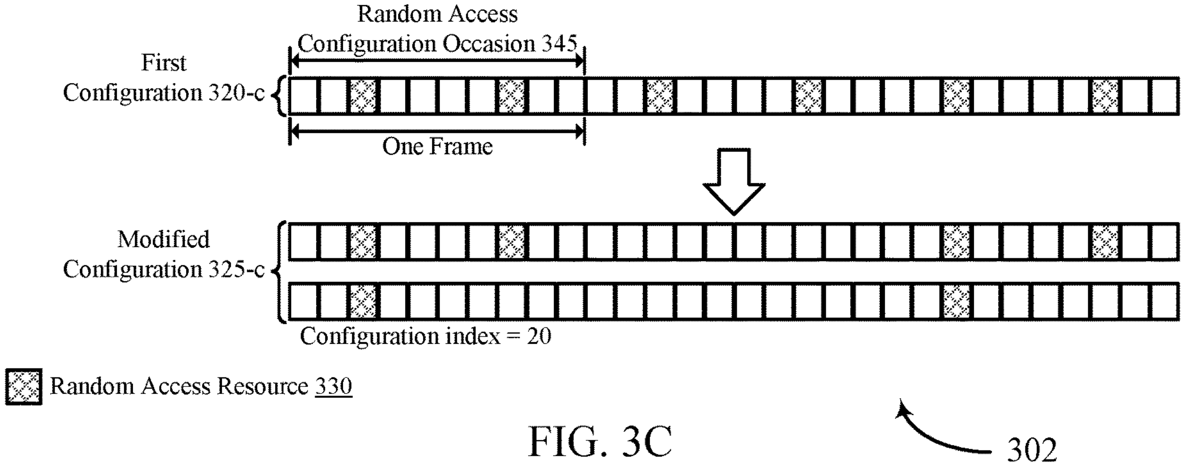

FIG. 3C depicts a random access scheme 302. In the random access scheme 302, the first configuration 320-*c* may include random access resources 330 that may be associated with a long random access format (e.g., a long PRACH format, such as a format associated with a value of L=839 (corresponding to a sequence length of 839)). In some examples, the first configuration 320-*c* may be transmitted or indicated in a SIB, such as SIB1, which may be updated relatively infrequently. As such, in some cases, a network entity may transmit one or more indications of modifications to be made to one or more parameters of the first configuration 320-*c*, effectively resulting in a modified configuration 325-*c*. In some examples, the modified configuration 325-*c* is not a configuration transmitted from the network entity, but may be the state of the first configuration 320-*c* after accounting for the modifications received from the network entity. However, in some examples, the modified configuration 325-*c* may be a configuration received or indicated by the network entity.

The random access scheme 302 may implement techniques for adaptation or modification of the random access resources 330 in associated with long random access formats (e.g., a long PRACH format). For example, a random access configuration occasion 345 may be modified by a scaling factor (e.g., from a set of possible values that may include, but is not limited to, {2,4,6,8}) to adjust a periodicity of random access configuration occasions 345. In some examples, the scaling factor may be greater than 1 (e.g., thereby increasing a periodicity value or other value to which the scaling factor may be applied) or less than 1 (e.g., thereby reducing a periodicity value or other value to which the scaling factor may be applied). In some examples, an effective random access configuration periodicity may be represented by S*P, where S is the scaling factor and P is a configuration periodicity indicated in control signaling (e.g., the first control signaling 220, which may be SIB signaling, such as SIB1 signaling). In some examples, the network entity may modify or adapt a sub-frame indication parameter that may indicate one or more sub-frames that are to be used for random access operations within one or more random access configuration occasions 345 that are remaining (e.g., in a periodic cycle associated with the random access occasion periodicity parameter).

For example, a network entity may transmit or indicate a random access configuration index of 20 to communicate to a UE which random access configuration the UE is to use. Such a configuration associated with an index of 20 may indicate a random access configuration that may include a 10 ms random access configuration periodicity and a random access format of 0. In a random access configuration period, random access signaling may be transmitted in some sub-frames, such as sub-frames 2 and 7. In some examples, a scaling factor may be applied, such as a scaling factor of 2. In some examples, a sub-frame indication may indicate which sub-frames are to be available for random access communications, such as through an indication (e.g., a bitmap) of [1 0].

Figure 3D:
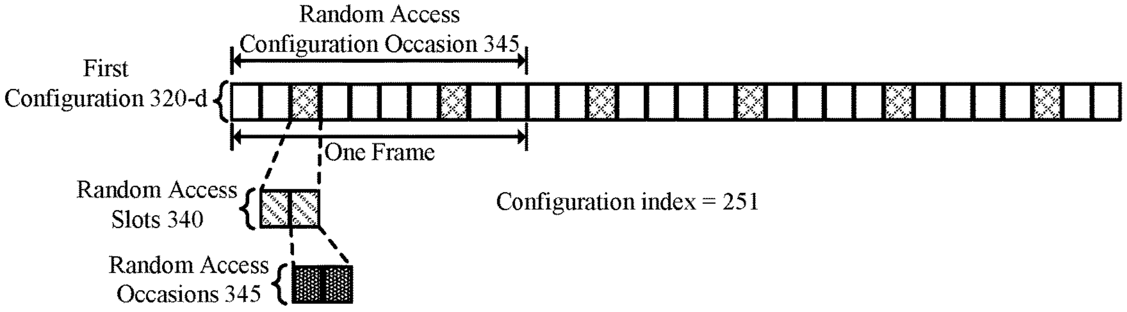

FIG. 3D depicts a random access scheme 303. The random access scheme 303 may be associated with modification or adaptation of random access parameters that are associated with the use of a short random access format (e.g., a short random access format associated with a value of L=139 (corresponding to a sequence length of 139)). Such modifications may be performed with relation to a first configuration 320-*d*.

The random access scheme 303 may implement techniques for adaptation or modification of the random access resources 330 in associated with long random access formats (e.g., a long PRACH format). For example, a random access configuration occasion 345 may be modified by a scaling factor (e.g., from a set of possible values that may include, but is not limited to, {2,4,6,8}) to adjust a periodicity of random access configuration occasions 345. In some examples, the scaling factor may be greater than 1 (e.g., thereby increasing a periodicity value or other value to which the scaling factor may be applied) or less than 1 (e.g., thereby reducing a periodicity value or other value to which the scaling factor may be applied). In some examples, an effective random access configuration periodicity may be represented by S*P, where S is the scaling factor and P is a configuration periodicity indicated in control signaling (e.g., the first control signaling 220, which may be SIB signaling, such as SIB1 signaling). In some examples, the network entity may modify or adapt a sub-frame indication parameter that may indicate one or more sub-frames that are to be used for random access operations (e.g., that at least a portion of a sub-frame is to be used or is available for random access operations) within one or more random access configuration occasions 345 that are remaining (e.g., in a periodic cycle associated with the random access occasion periodicity parameter). In some examples, the network entity may modify or adapt a slot parameter that may indicate one or more slots that are to be used for random access operations (e.g., that at least a portion of the slot is to be used or is available for random access operations). In some examples, the network entity may modify or adapt a random access occasion parameter that may indicate one or more occasions that are to be used for random access operations (e.g., that at least a portion of one or more occasions is to be used or is available for random access operations). In some examples, a value associated with a random access slot parameter and a random access occasion parameter may be indicated, modified, or adapted in tandem to implement random access occasion-level muting or other modifications of random access time-domain resources within a sub-frame.

For example, a network entity may transmit or indicate a random access configuration index of 251 to communicate to a UE which random access configuration the UE is to use. Such a configuration associated with an index of 251 may indicate a random access configuration that may include a 10 ms random access configuration periodicity and a random access format of C2. In a random access configuration period, random access signaling may be transmitted in some sub-frames, such as sub-frames 2 and 7. In some examples, a bitmap may be used to indicate which sub-frames, slots, and occasions are to be used or are available for random access operations. Such a bitmap may be of a format of [sub-frame, slot, occasion] and may include, as an example, values of [1 0, 1 0, 1 1] in accordance with the format. Additionally, or alternatively, a bitmap may be of a format of [sub-frame, occasion] and may include, as an example, values of [1 0, 1 0 1 1] in accordance with the format.

In some examples, as described herein, random access configuration periodicity values may be used to schedule random access configuration occasions (e.g., such as the random access configuration occasion 345) and may be modified or adapted as described herein, including through the use of a scaling factor that may be applied to such a periodicity value. In addition to such techniques, random access occasion association periodicity values or parameters may also be scaled with the use of a scaling factor (which may be, in some cases, the same scaling factor applied to random access configuration periodicity values or parameters). In some examples, a scaling factor may be greater than 1 or less than 1. In either case, such scaling may result in a value that may satisfy a threshold value (e.g., a lower threshold value or a higher threshold value). In such a case, even if the value would otherwise pass the threshold (e.g., either higher or lower), the value may be adjusted to a value at or near the threshold value. For example, if a lower threshold value for periodicity is 10 ms and a scaling factor would result in a periodicity value of 5 ms, the periodicity value may be adjusted to 10 ms so as to not exceed the threshold value (which, in this case may be a minimum permissible value). Similarly, if an upper threshold value for periodicity is 240 ms and a scaling factor would result in a periodicity value of 480 ms, the periodicity value may be adjusted to 240 ms so as to not exceed the threshold value (which, in this case may be a maximum permissible value).

Thus, a scaling factor may be applied to both random access configuration periods and association periods. Such use of a scaling factor may be applied to any modifications of random access resources 330 described herein. For example, the scaling factor may be applied to situations in which additional resources (e.g., the additional resource 335) are indicated as being available for random access operations as well as those situations in which existing random access resources 330 are muted or otherwise indicated as unavailable for random access operations. For example, adding one or more resources or random access occasions to those that are indicated as available may result in a reduction in an association period, whereas removing or muting one or more resources or random access occasions from those that are indicated as available may result in an increase in an association period. Given a scaling factor of S, both configuration periodicity values or parameters as well as association periodicity values or parameters may be adjusted, as is shown in Table 1, below:

TABLE 1

| Original random access configuration period (msec) | Original association period (quantity of random access configuration periods) | Modified random access configuration period | Modified association period (quantity of random access configuration periods) |
|---|---|---|---|
| 10 | {1, 2, 4, 8, 16} | 10*S | {1, 2, 4, 8, 16}*S |
| 20 | {1, 2, 4, 8} | 20*S | {1, 2, 4, 8}*S |
| 40 | {1, 2, 4} | 40*S | {1, 2, 4}*S |
| 80 | {1, 2} | 80*S | {1, 2}*S |
| 160 | {1} | 160*S | {1}*S |

Figure 4A:
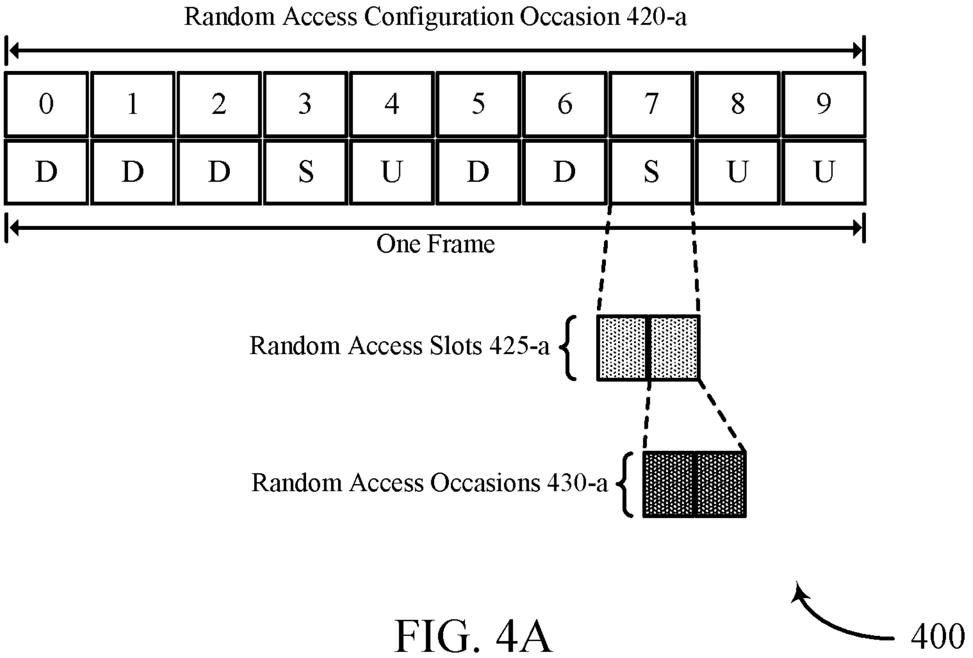
FIGS. 4A and 4B show examples of random access schemes that support techniques for adapting random access time-domain parameters.
Figure 4B:
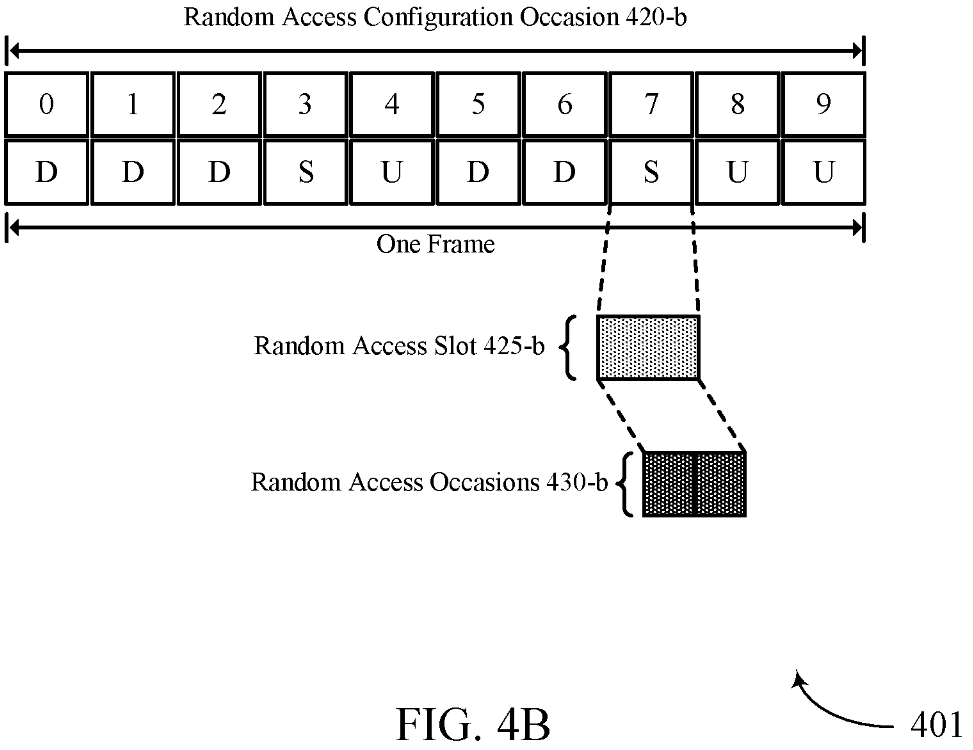

FIGS. 4A and 4B show examples of random access schemes, including random access scheme 400 and random access scheme 401 that support techniques for adapting random access time-domain parameters.

FIGS. 4A and 4B depict random access configuration occasions 420. FIG. 4A depicts an example with two random access slots 425-*a* and FIG. 4B depicts an example with a single random access slot 425-*b*. The random access configuration occasion 420 may be of a duration of a frame. The frame may include downlink (D) slots, uplink (U) slots, and special(S) slots. In some examples, an S slot may be configured with 10 downlink transmissions, a two-symbol guard period, and two uplink transmissions. However, other configurations of the S slot (e.g., different quantities of uplink, downlink, and/or guard symbols) are possible. If the random access slots 425 or random access occasions 430 are mapped into an S slot (e.g., as depicted), it may be desirable for resource muting based on slots, random access occasions, or both, to avoid additional switching between downlink symbols and uplink symbols, as such switching may introduce additional delays.

As such, in cases in which the random access slots 425 and the random access occasions 430 are mapped into an S slot and muting (or other alterations or modifications) of time-domain resources is supported, a first random access slot 425 or a first random access occasion 430 may be muted first. In other words, the muting of random access slots 425, random access occasions 430, or both, may be performed in the order in which they occur in time, from the start of the slot to the end of the slot. In other words, given two level muting involving both the two random access slots 425 and the random access occasion 430, a muting pattern for [random access slots, random access occasions] may be expressed as [0 0, 1 1]. Similarly, for a single level muting involving the random access occasions 430, a muting pattern for [random access occasions] may be expressed as [0 1].

For example, with reference to the random access configuration occasion 420-*a*, if the random access slots 425-*a* are to be muted, the random access slot 425-*a* that occurs first in time would be muted before the second random access slot 425-*a*. Similarly, the random access occasion 430-*a* occurring first in time would be muted before muting the following random access occasion 430-*a*.

Further, with reference to random access configuration occasion 420-*b*, where the slot 7 is an S slot and includes a single random access slot 425-*b*, the random access slot 425-*b*, being the lone random access slot in the S slot, would be muted first. Similar to the situation described in relation to the random access configuration occasion 420-*a*, the random access occasion 430-*b* occurring first in time would be muted before muting the following random access occasion 430-*b*.

In some examples, a network entity may indicate multiple random access configurations (e.g., 16 random access configurations or another quantity of random access configurations). In some examples, such multiple random access configurations may be in addition to random access configurations for "legacy" UEs and basic or baseline random access configurations. Thus, in some examples, if a network entity has conveyed multiple random access configurations for different UE features, the network entity may indicate a set or classification of UEs for which the adapted random access transmission is applicable. In some examples, a bitmap (e.g., of 5 bits) may be introduced to indicate one or more UE features for which the adapted random access configuration is applicable. In some examples, a mapping between a bit of the bitmap and a UE feature may depend on the quantity of conveyed random access configurations.

For example, assuming that a network entity has conveyed five random access configurations, one random access configuration may be intended for "legacy" UEs and one random access configuration each may be intended for RedCap UEs, SDT capable UEs, Msg3 repetition capable UEs, and slicing capable UEs. In such an example, a bitmap of [00000] may indicated that the adapted or modified random access configuration or transmission is applicable to "legacy" UEs. Further, a bitmap of [00001] may indicate applicability to RedCap UEs, a bitmap of may indicate applicability to SDT-capable UEs, a bitmap of [00011] may indicate applicability to Msg3 repetition capable UEs, and a bitmap of [00100] may indicate applicability to slicing capable UEs.

In some examples, adaptation or modification of random access configurations, or parameters or values thereof, may be supported for various functionalities of one or more UEs, including initial access, radio link failure, beam failure recovery, one or more other operations, or any combination thereof. In some examples, if a network entity has conveyed multiple random access configurations for different functionalities, the network entity may indicate one or more functionalities for which the adapted random access transmission is applicable. For example, the network entity may transmit a bitmap to indicate the UE functionality or functionalities for which the adapted random access is applicable. In other words, the modification or adaptation of the random access configuration may be applicable for a parameter (e.g., RACH-ConfigCommon or RACH-ConfigDedicated) that may be used for initial access, radio link failure, beam failure recovery, system information requests, contention based random-access handover, contention free random-access handover, one or more other functionalities or operations, or any combination thereof.

Figure 5:
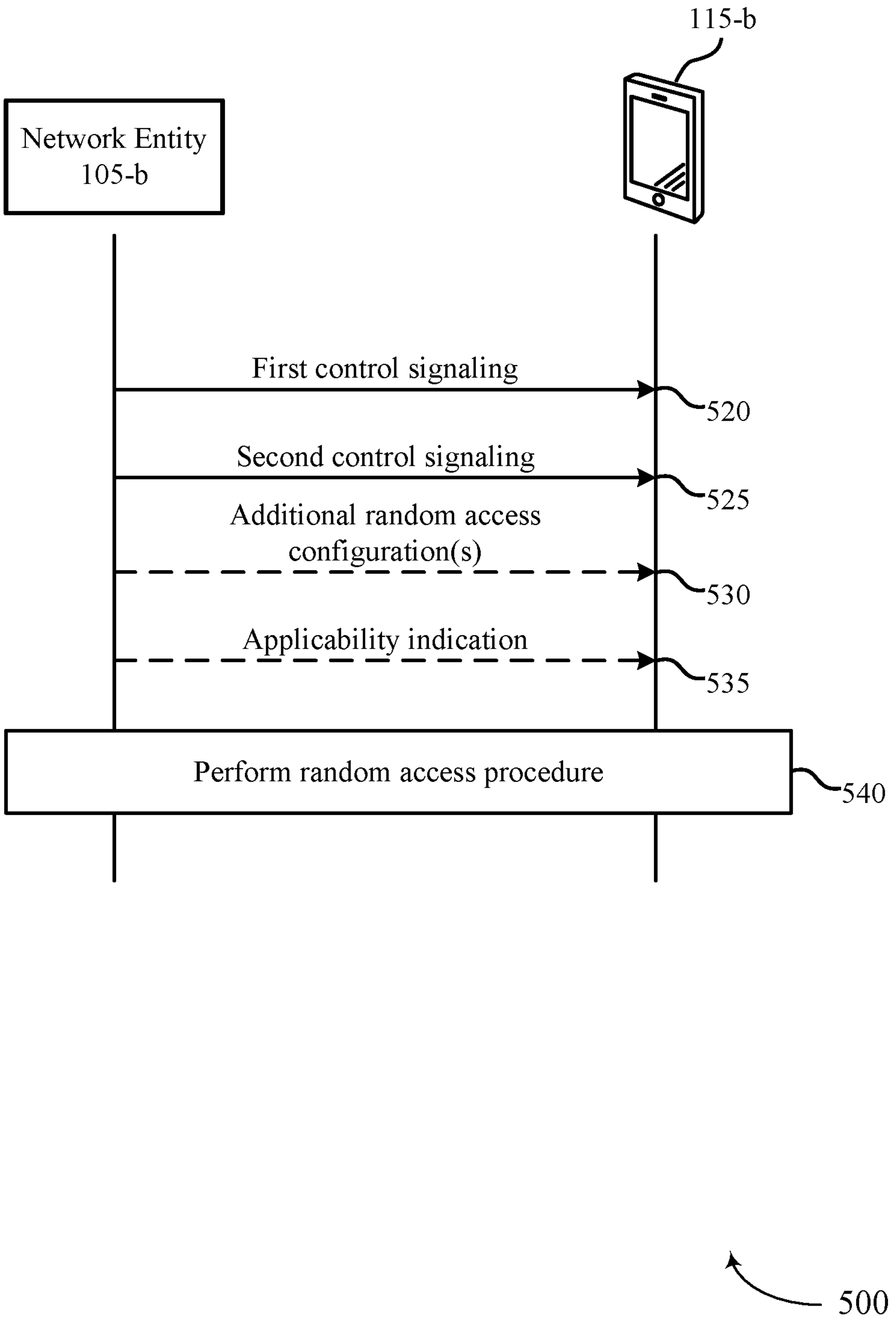
FIG. 5 shows an example of a process flow that supports techniques for adapting random access time-domain parameters.

FIG. 5 shows an example of a process flow 500 that supports techniques for adapting random access time-domain parameters. The process flow 500 may implement various aspects of the present disclosure described herein. The elements described in the process flow 500 (e.g., UE 115-*b* and network entity 105-*b*) may be examples of similarly named elements described herein.

In the following description of the process flow 500, the operations between the various entities or elements may be performed in different orders or at different times. Some operations may also be left out of the process flow 500, or other operations may be added. Although the various entities or elements are shown performing the operations of the process flow 500, some aspects of some operations may also be performed by other entities or elements of the process flow 500 or by entities or elements that are not depicted in the process flow, or any combination thereof.

At 520, the network entity 105-*b* may transmit, and the UE 115-*b* may receive, first control signaling indicating a random access configuration, the random access configuration that may include a plurality of time-domain parameters for one or more random access procedures. In some examples, the first control signaling may include system information block signaling or radio resource control signaling.

At 525, the network entity 105-*b* may transmit, and the UE 115-*b* may receive second control signaling that modifies a subset of the plurality of time-domain parameters indicated in the random access configuration. In some examples, the subset of the plurality of time-domain parameters may include a periodicity parameter, a subframe number parameter, a quantity of random access slots within a subframe, a quantity of random access occasions within a random access slot, or any combination thereof. In some examples, the second control signaling may include paging downlink control information signaling, paging message signaling, paging early indication signaling, downlink control information signaling, or scheduling downlink control information signaling.

In some examples, the UE 115-*b* may, to receive the second control signaling, receive the second control signaling that may include an indication that one or more time-domain resources for performing the one or more random access procedures indicated via the random access configuration are to be disregarded by the UE 115-*b* and the random access procedure is performed via time-domain resources that are different from the one or more time-domain resources to be disregarded by the UE 115-*b*. In some examples, the UE 115-*b* may receive, via the second control signaling, an indication of a bitmap indicating one or more sub-frames in which the one or more time-domain resources that are to be disregarded by the UE 115-*b* are located. In some examples, the UE 115-*b* may receive, via the second control signaling, an indication of one or more slots in which the one or more time-domain resources that are to be disregarded by the UE are located. In some examples, the one or more time-domain resources that are to be disregarded by the UE 115-*b* comprise one or more random access slots that occur first in time in a special slot (e.g., an S slot) of a frame or one or more random access occasions that occur first in time in a random access slot of one of the one or more random access slots.

In some examples, the UE 115-*b* may receive, via the second control signaling, an indication of a scaling factor associated with a random access resource periodicity indicated in the random access configuration and the indication that the one or more time-domain resources are to be disregarded is based on the scaling factor. In some examples, the second control signaling may include an indication of a scaling parameter applicable to a random access occasion periodicity parameter indicated via the random access configuration and a random access association periodicity parameter indicated via the random access configuration.

In some examples, the UE 115-*b* may receive, via the second control signaling, an indication of one or more random access occasions in which the one or more time-domain resources that are to be disregarded by the UE 115-*b* are located.

In some examples, the UE 115-*b* may receive the second control signaling that may include an indication of one or more additional time-domain resources for performing the random access procedure relative to time-domain resources indicated in the random access configuration and the random access procedure is performed using at least one of the one or more additional time-domain resources.

In some examples, the UE 115-*b* may receive the second control signaling that may include an indication of an additional random access configuration index corresponding to an additional random access configuration that corresponds to one or more modified values for the subset of the plurality of time-domain parameters indicated in the random access configuration.

In some examples, the UE 115-*b* may receive the second control signaling that may include an indication of one or more modified values for the subset of the plurality of time-domain parameters indicated in the random access configuration.

At 530, the network entity 105-*b* may transmit, and the UE 115-*b* may receive a plurality of additional random access configurations corresponding to a plurality of UE features, or a plurality of UE functionalities, or both.

At 535, the network entity 105-*b* may transmit, and the UE 115-*b* may receive an indication of one or more of the plurality of additional random access configurations to which the modified subset of the plurality of time-domain parameters is applicable. In some examples, the indication of one or more of the plurality of additional random access configurations to which the modified subset is applicable may include a bitmap. In some examples, respective bits of the bitmap are mapped to respective UE features of the plurality of UE features or respective UE functionalities of the plurality of UE functionalities.

At 540, the UE 115-*b* may perform a random access procedure in accordance with the modified subset of the plurality of time-domain parameters. For example, the UE 115-*b* may transmit a random access preamble using one or more random access occasions that correspond to the modified time-domain parameters indicated by the second control signaling (e.g., received at 525).

Figure 6:
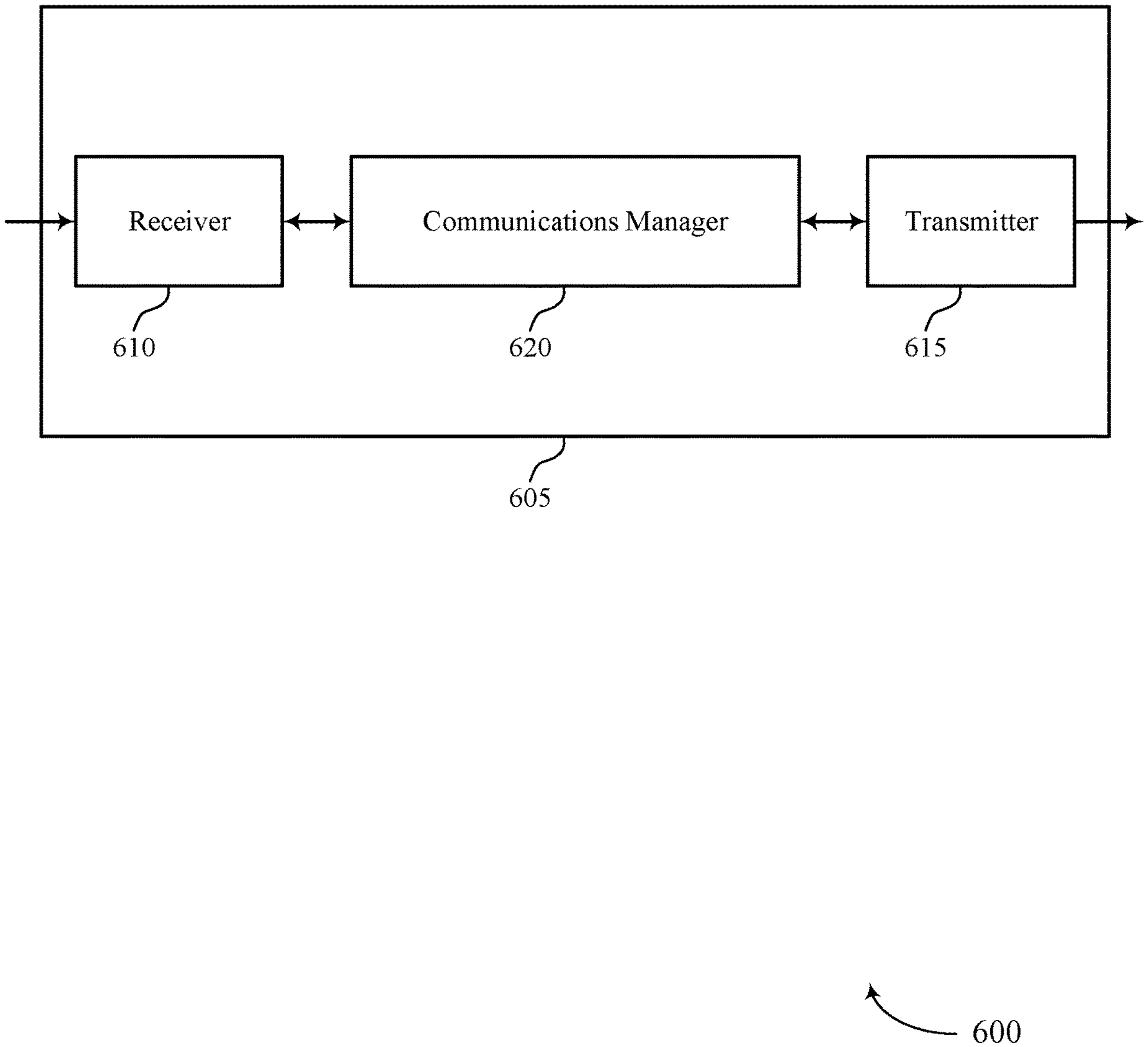
FIGS. 6 and 7 show block diagrams of devices that support techniques for adapting random access time-domain parameters.

FIG. 6 shows a block diagram 600 of a device 605 that supports techniques for adapting random access time-domain parameters. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for adapting random access time-domain parameters). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for adapting random access time-domain parameters). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations or components thereof may be examples of means for performing various aspects of techniques for adapting random access time-domain parameters as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor (e.g., referred to as a processor-executable code). If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

Additionally, or alternatively, the communications manager 620 may support wireless communications in accordance with examples as disclosed herein. For example, the communications manager 620 is capable of, configured to, or operable to support a means for receiving first control signaling indicating a random access configuration, the random access configuration including a set of multiple time-domain parameters for one or more random access procedures. The communications manager 620 is capable of, configured to, or operable to support a means for receiving second control signaling that modifies a subset of the set of multiple time-domain parameters indicated in the random access configuration. The communications manager 620 is capable of, configured to, or operable to support a means for performing a random access procedure in accordance with the modified subset of the set of multiple time-domain parameters.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption, more efficient utilization of communication resources, or any combination thereof.

Figure 7:
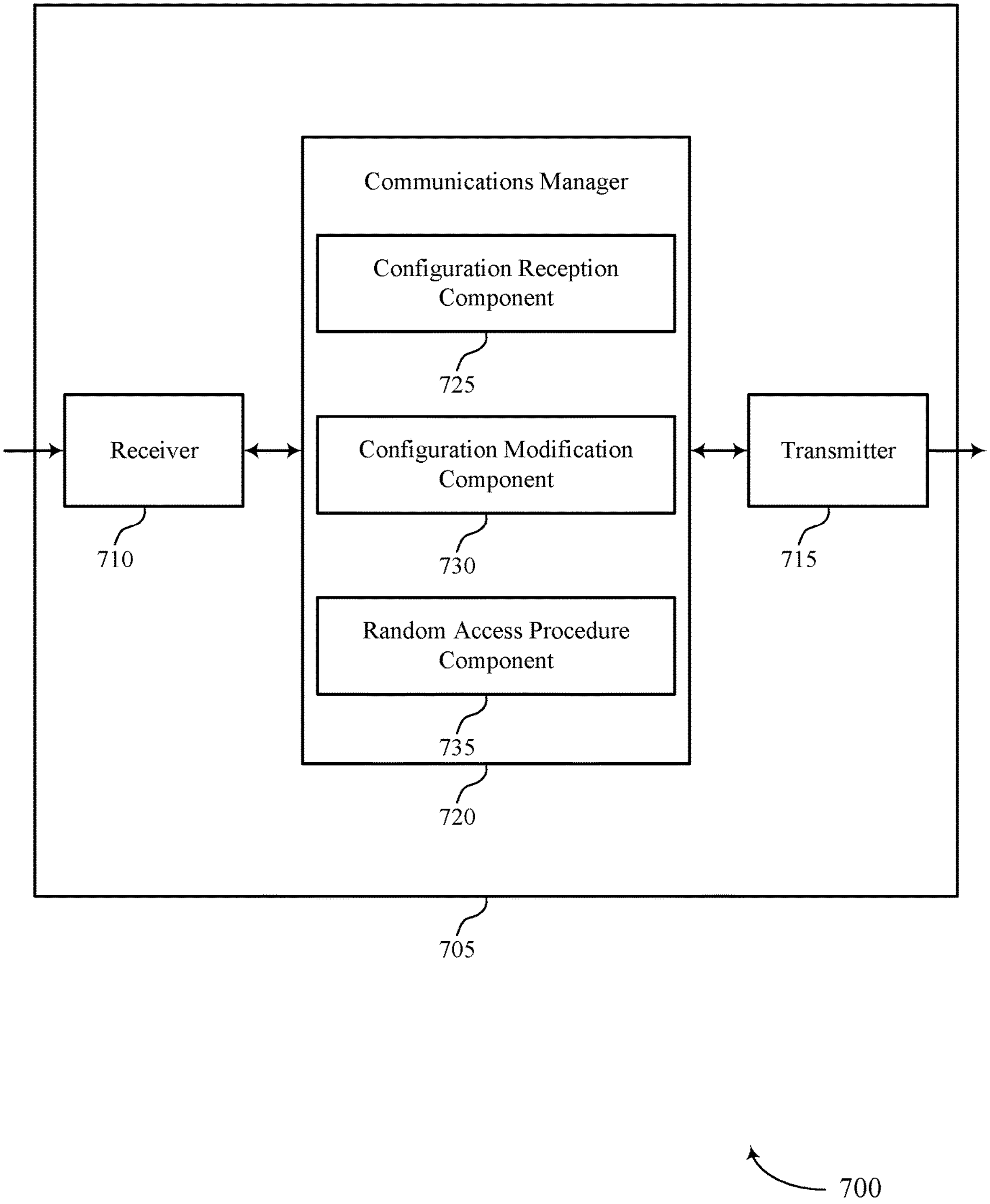

FIG. 7 shows a block diagram 700 of a device 705 that supports techniques for adapting random access time-domain parameters. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for adapting random access time-domain parameters). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for adapting random access time-domain parameters). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for adapting random access time-domain parameters as described herein. For example, the communications manager 720 may include a configuration reception component 725, a configuration modification component 730, a random access procedure component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The configuration reception component 725 is capable of, configured to, or operable to support a means for receiving first control signaling indicating a random access configuration, the random access configuration including a set of multiple time-domain parameters for one or more random access procedures. The configuration modification component 730 is capable of, configured to, or operable to support a means for receiving second control signaling that modifies a subset of the set of multiple time-domain parameters indicated in the random access configuration. The random access procedure component 735 is capable of, configured to, or operable to support a means for performing a random access procedure in accordance with the modified subset of the set of multiple time-domain parameters.

Figure 8:
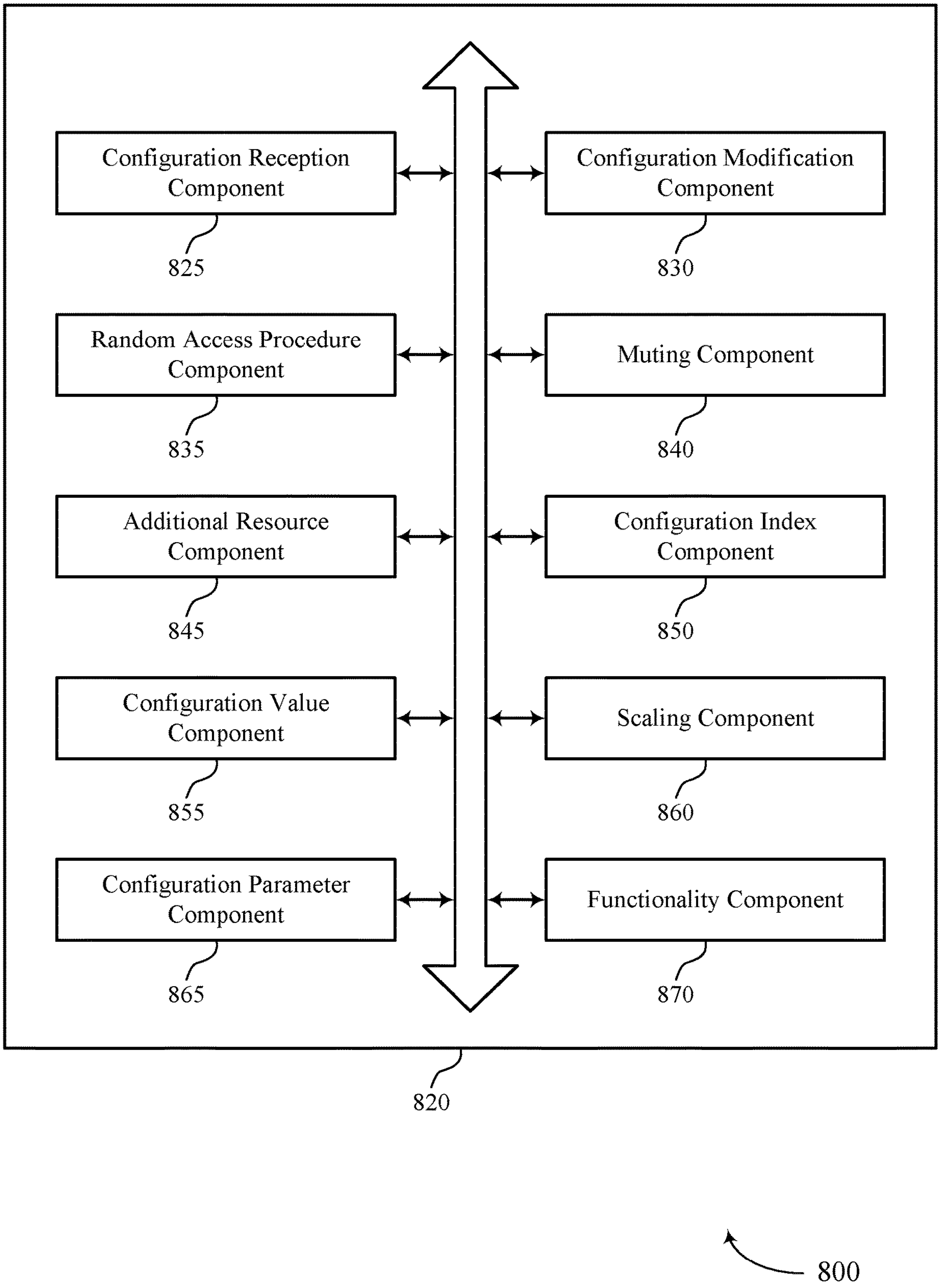
FIG. 8 shows a block diagram of a communications manager that supports techniques for adapting random access time-domain parameters.

FIG. 8 shows a block diagram 800 of a communications manager 820 that supports techniques for adapting random access time-domain parameters. The communications manager 820 may be an example of aspects of a communications manager 620, a communications manager 720, or both, as described herein. The communications manager 820, or various components thereof, may be an example of means for performing various aspects of techniques for adapting random access time-domain parameters as described herein. For example, the communications manager 820 may include a configuration reception component 825, a configuration modification component 830, a random access procedure component 835, a muting component 840, an additional resource component 845, a configuration index component 850, a configuration value component 855, a scaling component 860, a configuration parameter component 865, a functionality component 870, or any combination thereof. Each of these components, or components or subcomponents thereof (e.g., one or more processors, one or more memories), may communicate, directly or indirectly, with one another (e.g., via one or more buses).

Additionally, or alternatively, the communications manager 820 may support wireless communications in accordance with examples as disclosed herein. The configuration reception component 825 is capable of, configured to, or operable to support a means for receiving first control signaling indicating a random access configuration, the random access configuration including a set of multiple time-domain parameters for one or more random access procedures. The configuration modification component 830 is capable of, configured to, or operable to support a means for receiving second control signaling that modifies a subset of the set of multiple time-domain parameters indicated in the random access configuration. The random access procedure component 835 is capable of, configured to, or operable to support a means for performing a random access procedure in accordance with the modified subset of the set of multiple time-domain parameters.

In some examples, to support receiving the second control signaling, the muting component 840 is capable of, configured to, or operable to support a means for receiving the second control signaling including an indication that one or more time-domain resources for performing the one or more random access procedures indicated via the random access configuration are to be disregarded by the UE, where the random access procedure is performed via time-domain resources that are different from the one or more time-domain resources to be disregarded by the UE.

In some examples, the muting component 840 is capable of, configured to, or operable to support a means for receiving, via the second control signaling, an indication of a scaling factor associated with a random access resource periodicity indicated in the random access configuration, where the indication that the one or more time-domain resources are to be disregarded is based on the scaling factor.

In some examples, the muting component 840 is capable of, configured to, or operable to support a means for receiving, via the second control signaling, an indication of a bitmap indicating one or more sub-frames in which the one or more time-domain resources that are to be disregarded by the UE are located.

In some examples, the muting component 840 is capable of, configured to, or operable to support a means for receiving, via the second control signaling, an indication of one or more slots in which the one or more time-domain resources that are to be disregarded by the UE are located.

In some examples, the muting component 840 is capable of, configured to, or operable to support a means for receiving, via the second control signaling, an indication of one or more random access occasions in which the one or more time-domain resources that are to be disregarded by the UE are located.

In some examples, the one or more time-domain resources that are to be disregarded by the UE include one or more random access slots that occur first in time in a special slot of a frame or one or more random access occasions that occur first in time in a random access slot of one of the one or more random access slots.

In some examples, to support receiving the second control signaling, the additional resource component 845 is capable of, configured to, or operable to support a means for receiving the second control signaling including an indication of one or more additional time-domain resources for performing the random access procedure relative to time-domain resources indicated in the random access configuration, where the random access procedure is performed using at least one of the one or more additional time-domain resources.

In some examples, to support receiving the second control signaling, the configuration index component 850 is capable of, configured to, or operable to support a means for receiving the second control signaling including an indication of an additional random access configuration index corresponding to an additional random access configuration that corresponds to one or more modified values for the subset of the set of multiple time-domain parameters indicated in the random access configuration.

In some examples, to support receiving the second control signaling, the configuration value component 855 is capable of, configured to, or operable to support a means for receiving the second control signaling including an indication of one or more modified values for the subset of the set of multiple time-domain parameters indicated in the random access configuration.

In some examples, the second control signaling includes an indication of a scaling parameter applicable to a random access occasion periodicity parameter indicated via the random access configuration and a random access association periodicity parameter indicated via the random access configuration.

In some examples, the configuration reception component 825 is capable of, configured to, or operable to support a means for receiving a set of multiple additional random access configurations corresponding to a set of multiple UE features, or a set of multiple UE functionalities, or both. In some examples, the configuration reception component 825 is capable of, configured to, or operable to support a means for receiving an indication of one or more of the set of multiple additional random access configurations to which the modified subset of the set of multiple time-domain parameters is applicable.

In some examples, the indication of one or more of the set of multiple additional random access configurations to which the modified subset is applicable includes a bitmap. In some examples, respective bits of the bitmap are mapped to respective UE features of the set of multiple UE features or respective UE functionalities of the set of multiple UE functionalities.

In some examples, the subset of the set of multiple time-domain parameters includes a periodicity parameter, a subframe number parameter, a quantity of random access slots within a subframe, a quantity of random access occasions within a random access slot, or any combination thereof.

In some examples, the first control signaling includes system information block signaling or radio resource control signaling.

In some examples, the second control signaling includes paging downlink control information signaling, paging message signaling, paging early indication signaling, downlink control information signaling, or scheduling downlink control information signaling.

Figure 9:
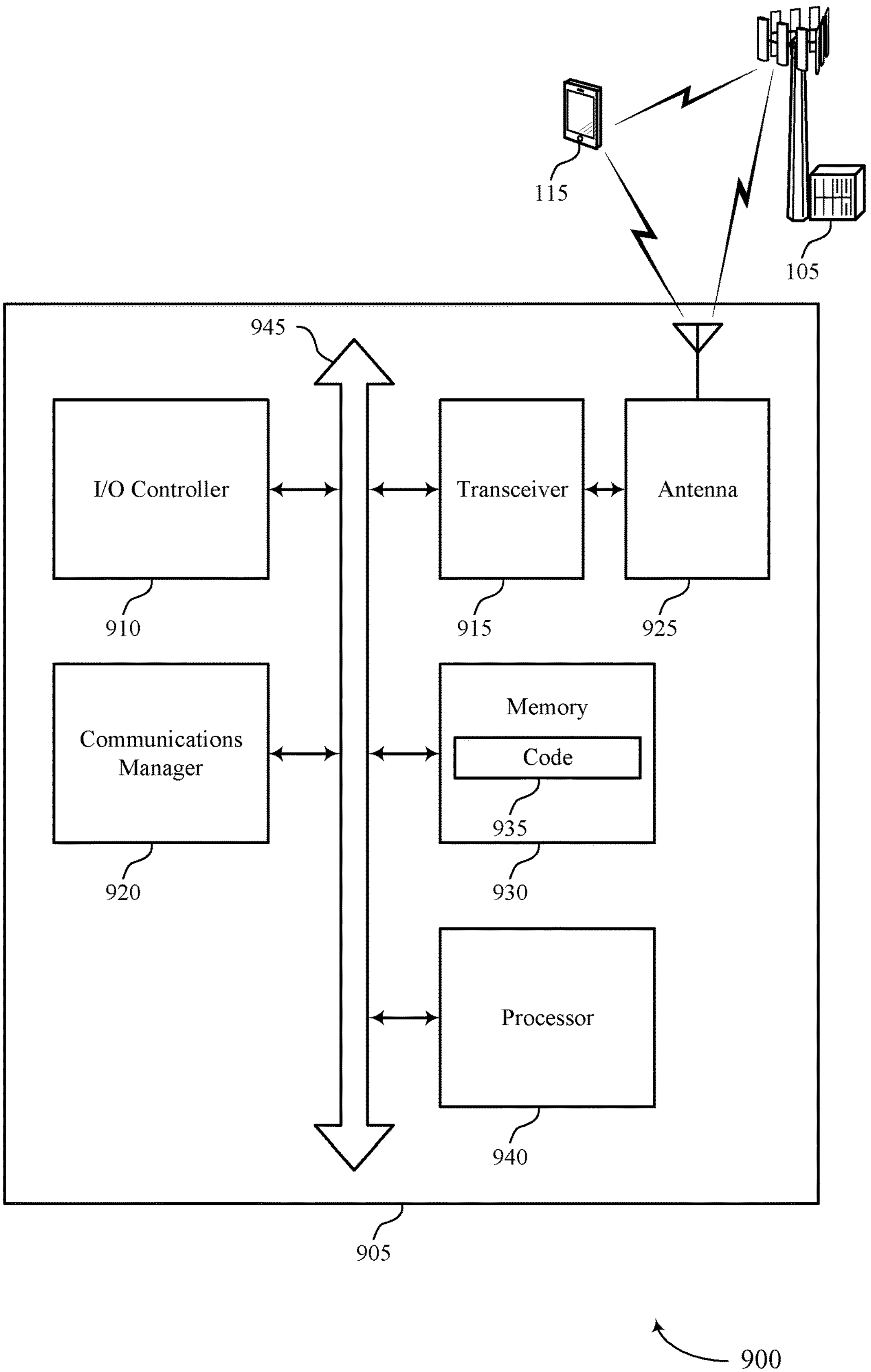
FIG. 9 shows a diagram of a system including a device that supports techniques for adapting random access time-domain parameters.

FIG. 9 shows a diagram of a system 900 including a device 905 that supports techniques for adapting random access time-domain parameters. The device 905 may be an example of or include components of a device 605, a device 705, or a UE 115 as described herein. The device 905 may communicate (e.g., wirelessly) with one or more other devices (e.g., network entities 105, UEs 115, or a combination thereof). The device 905 may include components for bi-directional voice and data communications including components for transmitting and receiving communications, such as a communications manager 920, an input/output (I/O) controller, such as an I/O controller 910, a transceiver 915, one or more antennas 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna. However, in some other cases, the device 905 may have more than one antenna, which may be capable of concurrently transmitting or receiving multiple wireless transmissions. The transceiver 915 may communicate bi-directionally via the one or more antennas 925 using wired or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable, or processor-executable code, such as the code 935. The code 935 may include instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may include, among other things, a basic I/O system (BIOS) which may control basic hardware or software operation such as the interaction with peripheral components or devices.

The at least one processor 940 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting techniques for adapting random access time-domain parameters). For example, the device 905 or a component of the device 905 may include at least one processor 940 and at least one memory 930 coupled with or to the at least one processor 940, the at least one processor 940 and the at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions described herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code 935 (e.g., processor-executable code) stored in the at least one memory 930 or otherwise, to perform one or more of the functions described herein.

Additionally, or alternatively, the communications manager 920 may support wireless communications in accordance with examples as disclosed herein. For example, the communications manager 920 is capable of, configured to, or operable to support a means for receiving first control signaling indicating a random access configuration, the random access configuration including a set of multiple time-domain parameters for one or more random access procedures. The communications manager 920 is capable of, configured to, or operable to support a means for receiving second control signaling that modifies a subset of the set of multiple time-domain parameters indicated in the random access configuration. The communications manager 920 is capable of, configured to, or operable to support a means for performing a random access procedure in accordance with the modified subset of the set of multiple time-domain parameters.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of techniques for adapting random access time-domain parameters as described herein, or the at least one processor 940 and the at least one memory 930 may be otherwise configured to, individually or collectively, perform or support such operations.

Figure 10:
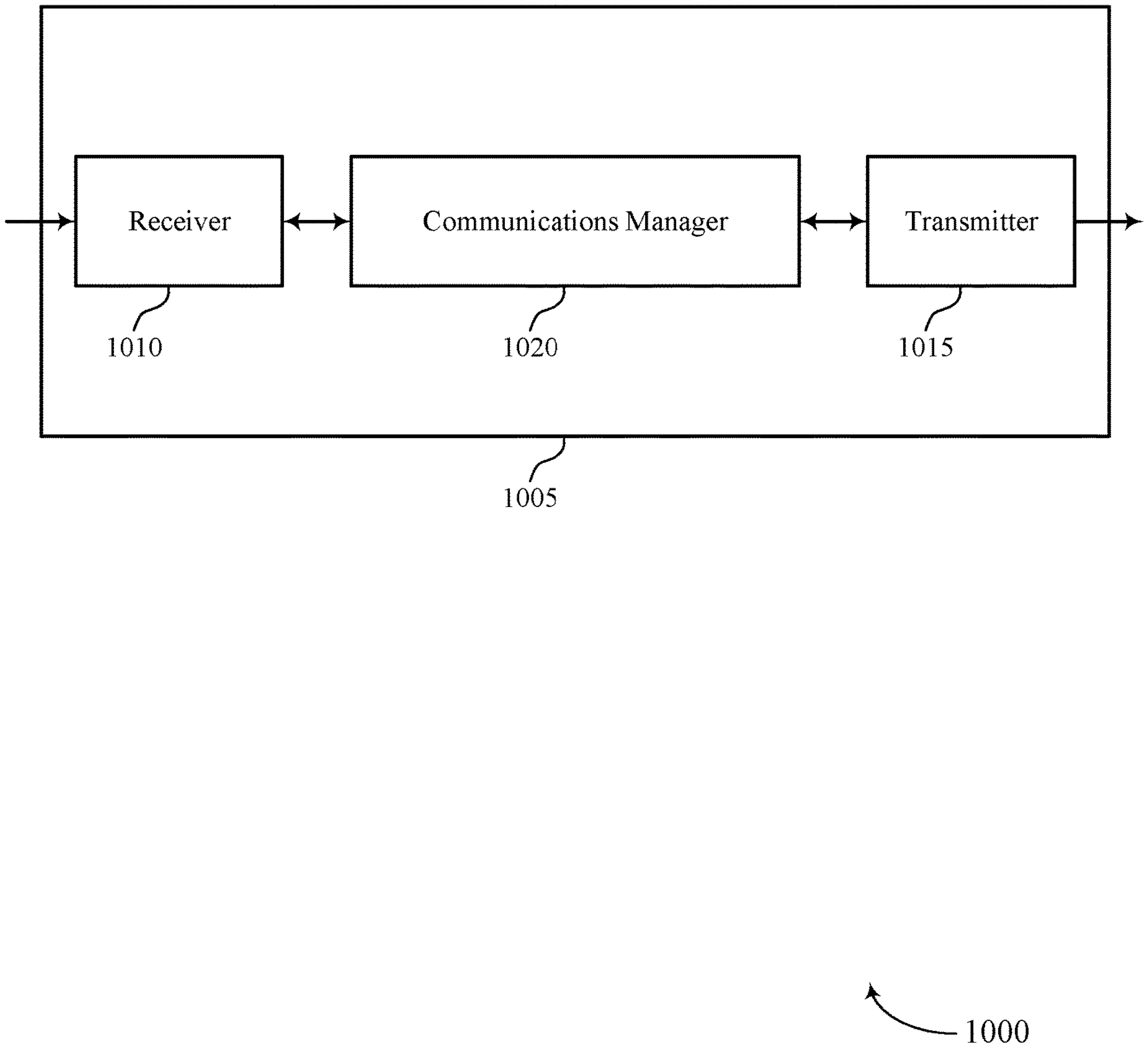
FIGS. 10 and 11 show block diagrams of devices that support techniques for adapting random access time-domain parameters.

FIG. 10 shows a block diagram 1000 of a device 1005 that supports techniques for adapting random access time-domain parameters. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations or components thereof may be examples of means for performing various aspects of techniques for adapting random access time-domain parameters as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor (e.g., referred to as a processor-executable code). If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

Additionally, or alternatively, the communications manager 1020 may support wireless communications in accordance with examples as disclosed herein. For example, the communications manager 1020 is capable of, configured to, or operable to support a means for outputting first control signaling indicating a random access configuration, the random access configuration including a set of multiple time-domain parameters for one or more random access procedures. The communications manager 1020 is capable of, configured to, or operable to support a means for outputting second control signaling that modifies a subset of the set of multiple time-domain parameters indicated in the random access configuration. The communications manager 1020 is capable of, configured to, or operable to support a means for performing a random access procedure in accordance with the modified subset of the set of multiple time-domain parameters.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for reduced processing, reduced power consumption, more efficient utilization of communication resources, or any combination thereof.

Figure 11:
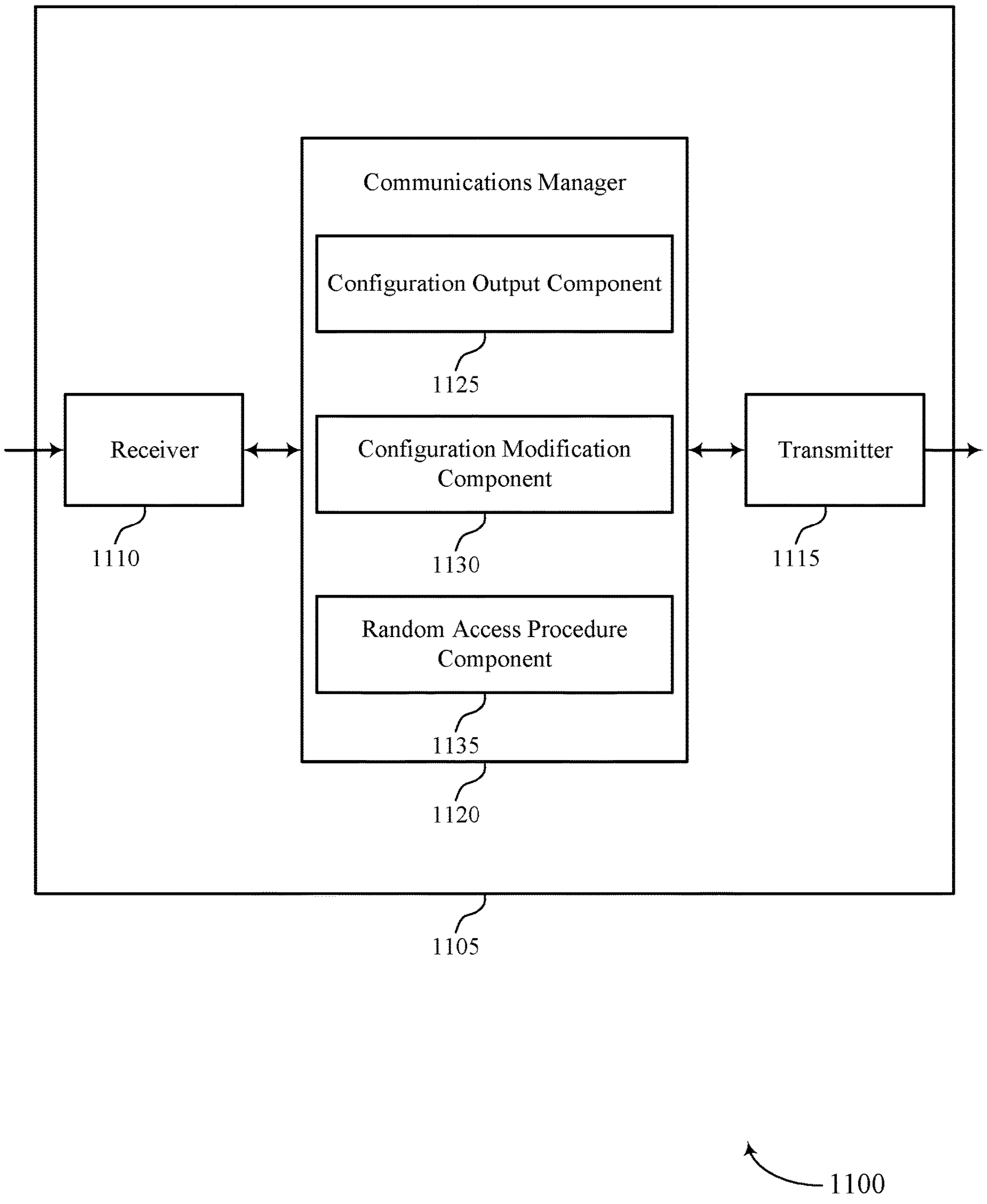

FIG. 11 shows a block diagram 1100 of a device 1105 that supports techniques for adapting random access time-domain parameters. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for adapting random access time-domain parameters as described herein. For example, the communications manager 1120 may include a configuration output component 1125, a configuration modification component 1130, a random access procedure component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The configuration output component 1125 is capable of, configured to, or operable to support a means for outputting first control signaling indicating a random access configuration, the random access configuration including a set of multiple time-domain parameters for one or more random access procedures. The configuration modification component 1130 is capable of, configured to, or operable to support a means for outputting second control signaling that modifies a subset of the set of multiple time-domain parameters indicated in the random access configuration. The random access procedure component 1135 is capable of, configured to, or operable to support a means for performing a random access procedure in accordance with the modified subset of the set of multiple time-domain parameters.

Figure 12:
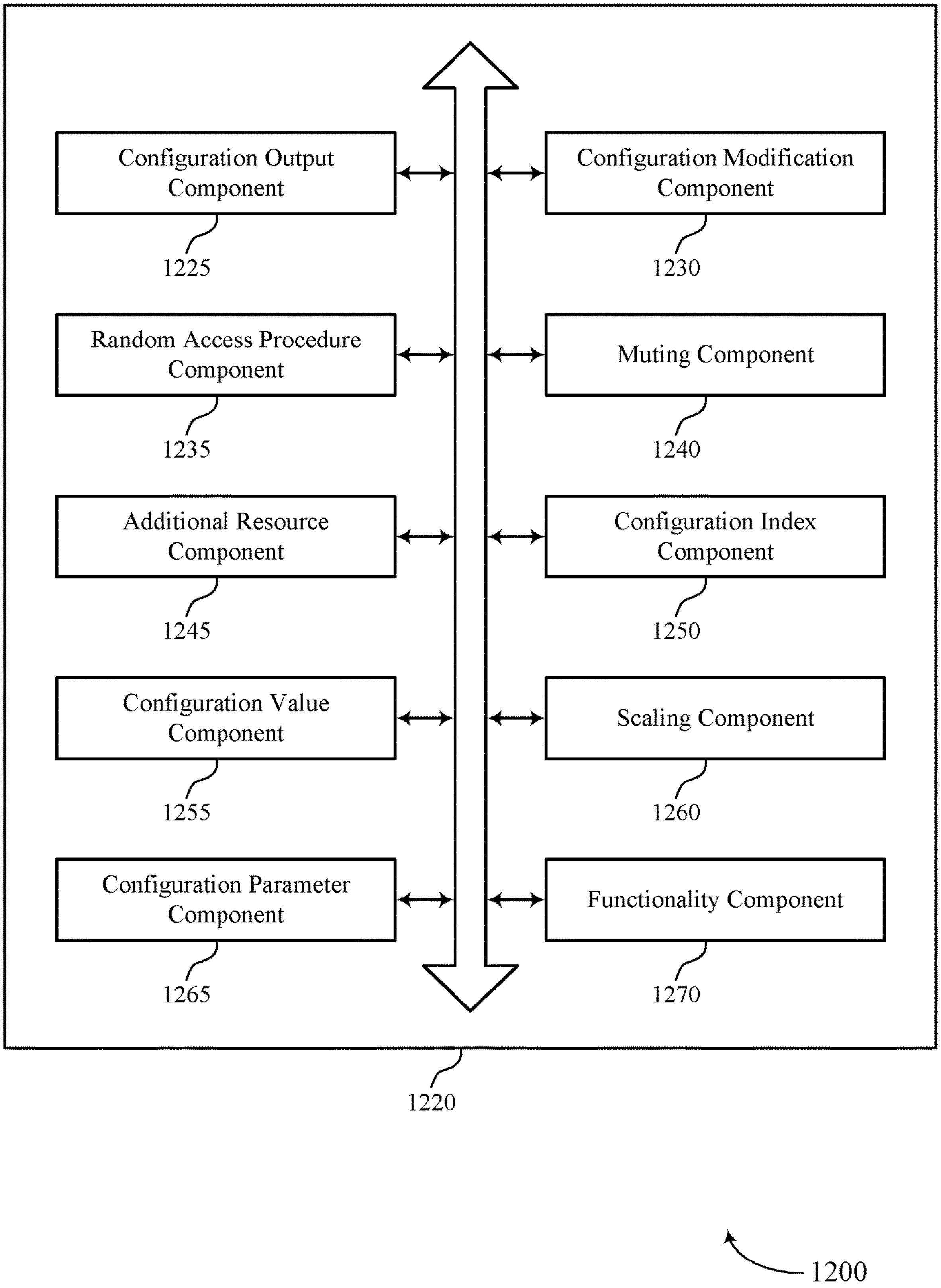
FIG. 12 shows a block diagram of a communications manager that supports techniques for adapting random access time-domain parameters.

FIG. 12 shows a block diagram 1200 of a communications manager 1220 that supports techniques for adapting random access time-domain parameters. The communications manager 1220 may be an example of aspects of a communications manager 1020, a communications manager 1120, or both, as described herein. The communications manager 1220, or various components thereof, may be an example of means for performing various aspects of techniques for adapting random access time-domain parameters as described herein. For example, the communications manager 1220 may include a configuration output component 1225, a configuration modification component 1230, a random access procedure component 1235, a muting component 1240, an additional resource component 1245, a configuration index component 1250, a configuration value component 1255, a scaling component 1260, a configuration parameter component 1265, a functionality component 1270, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

Additionally, or alternatively, the communications manager 1220 may support wireless communications in accordance with examples as disclosed herein. The configuration output component 1225 is capable of, configured to, or operable to support a means for outputting first control signaling indicating a random access configuration, the random access configuration including a set of multiple time-domain parameters for one or more random access procedures. The configuration modification component 1230 is capable of, configured to, or operable to support a means for outputting second control signaling that modifies a subset of the set of multiple time-domain parameters indicated in the random access configuration. The random access procedure component 1235 is capable of, configured to, or operable to support a means for performing a random access procedure in accordance with the modified subset of the set of multiple time-domain parameters.

In some examples, to support outputting the second control signaling, the muting component 1240 is capable of, configured to, or operable to support a means for outputting the second control signaling including an indication that one or more time-domain resources for performing the one or more random access procedures indicated via the random access configuration are to be disregarded by the UE, where the random access procedure is performed via time-domain resources that are different from the one or more time-domain resources to be disregarded by the UE.

In some examples, the muting component 1240 is capable of, configured to, or operable to support a means for outputting, via the second control signaling, an indication of a scaling factor associated with a random access resource periodicity indicated in the random access configuration, where the indication that the one or more time-domain resources are to be disregarded is based on the scaling factor.

In some examples, the muting component 1240 is capable of, configured to, or operable to support a means for outputting, via the second control signaling, an indication of a bitmap indicating one or more sub-frames in which the one or more time-domain resources that are to be disregarded by the UE are located.

In some examples, the muting component 1240 is capable of, configured to, or operable to support a means for outputting, via the second control signaling, an indication of one or more slots in which the one or more time-domain resources that are to be disregarded by the UE are located.

In some examples, the muting component 1240 is capable of, configured to, or operable to support a means for outputting, via the second control signaling, an indication of one or more random access occasions in which the one or more time-domain resources that are to be disregarded by the UE are located.

In some examples, the one or more time-domain resources that are to be disregarded by the UE include one or more random access slots that occur first in time in a special slot of a frame or one or more random access occasions that occur first in time in a random access slot of one of the one or more random access slots.

In some examples, to support outputting the second control signaling, the additional resource component 1245 is capable of, configured to, or operable to support a means for outputting the second control signaling including an indication of one or more additional time-domain resources for performing the random access procedure relative to time-domain resources indicated in the random access configuration, where the random access procedure is performed using at least one of the one or more additional time-domain resources.

In some examples, to support outputting the second control signaling, the configuration index component 1250 is capable of, configured to, or operable to support a means for outputting the second control signaling including an indication of an additional random access configuration index corresponding to an additional random access configuration that corresponds to one or more modified values for the subset of the set of multiple time-domain parameters indicated in the random access configuration.

In some examples, to support outputting the second control signaling, the configuration value component 1255 is capable of, configured to, or operable to support a means for outputting the second control signaling including an indication of one or more modified values for the subset of the set of multiple time-domain parameters indicated in the random access configuration.

In some examples, the second control signaling includes an indication of a scaling parameter applicable to a random access occasion periodicity parameter indicated via the random access configuration and a random access association periodicity parameter indicated via the random access configuration.

In some examples, the configuration output component 1225 is capable of, configured to, or operable to support a means for outputting a set of multiple additional random access configurations corresponding to a set of multiple UE features, or a set of multiple UE functionalities, or both. In some examples, the configuration output component 1225 is capable of, configured to, or operable to support a means for outputting an indication of one or more of the set of multiple additional random access configurations to which the modified subset of the set of multiple time-domain parameters is applicable.

In some examples, the indication of one or more of the set of multiple additional random access configurations to which the modified subset is applicable includes a bitmap. In some examples, respective bits of the bitmap are mapped to respective UE features of the set of multiple UE features or respective UE functionalities of the set of multiple UE functionalities.

In some examples, the subset of the set of multiple time-domain parameters includes a periodicity parameter, a subframe number parameter, a quantity of random access slots within a subframe, a quantity of random access occasions within a random access slot, or any combination thereof.

In some examples, the first control signaling includes system information block signaling or radio resource control signaling.

In some examples, the second control signaling includes paging downlink control information signaling, paging message signaling, paging early indication signaling, downlink control information signaling, or scheduling downlink control information signaling.

Figure 13:
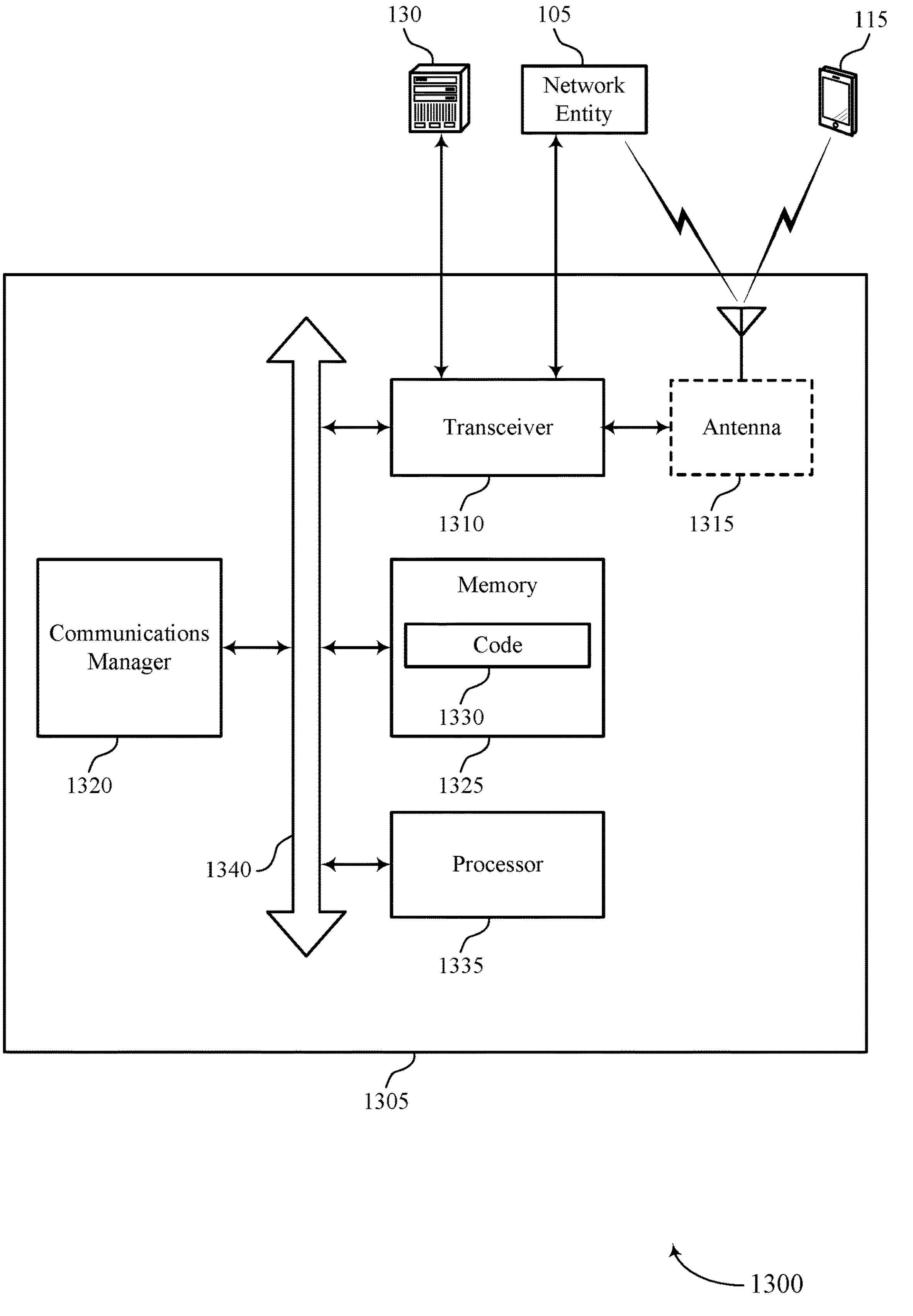
FIG. 13 shows a diagram of a system including a device that supports techniques for adapting random access time-domain parameters.

FIG. 13 shows a diagram of a system 1300 including a device 1305 that supports techniques for adapting random access time-domain parameters. The device 1305 may be an example of or include components of a device 1005, a device 1105, or a network entity 105 as described herein. The device 1305 may communicate with other network devices or network equipment such as one or more of the network entities 105, UEs 115, or any combination thereof. The communications may include communications over one or more wired interfaces, over one or more wireless interfaces, or any combination thereof. The device 1305 may include components that support outputting and obtaining communications, such as a communications manager 1320, a transceiver 1310, one or more antennas 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., communication link(s) 125, backhaul communication link(s) 120, a midhaul communication link 162, a fronthaul communication link 168).

The at least one memory 1325 may include RAM, ROM, or any combination thereof. The at least one memory 1325 may store computer-readable, computer-executable, or processor-executable code, such as the code 1330. The code 1330 may include instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may include, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting techniques for adapting random access time-domain parameters). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. For example, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with one or more other network entities 105, and may include a controller or scheduler for controlling communications with UEs 115 (e.g., in cooperation with the one or more other network devices). In some examples, the communications manager 1320 may support an X2 interface within an LTE/LTE-A wireless communications network technology to provide communication between network entities 105.

Additionally, or alternatively, the communications manager 1320 may support wireless communications in accordance with examples as disclosed herein. For example, the communications manager 1320 is capable of, configured to, or operable to support a means for outputting first control signaling indicating a random access configuration, the random access configuration including a set of multiple time-domain parameters for one or more random access procedures. The communications manager 1320 is capable of, configured to, or operable to support a means for outputting second control signaling that modifies a subset of the set of multiple time-domain parameters indicated in the random access configuration. The communications manager 1320 is capable of, configured to, or operable to support a means for performing a random access procedure in accordance with the modified subset of the set of multiple time-domain parameters.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of techniques for adapting random access time-domain parameters as described herein, or the at least one processor 1335 and the at least one memory 1325 may be otherwise configured to, individually or collectively, perform or support such operations.

Figure 14:
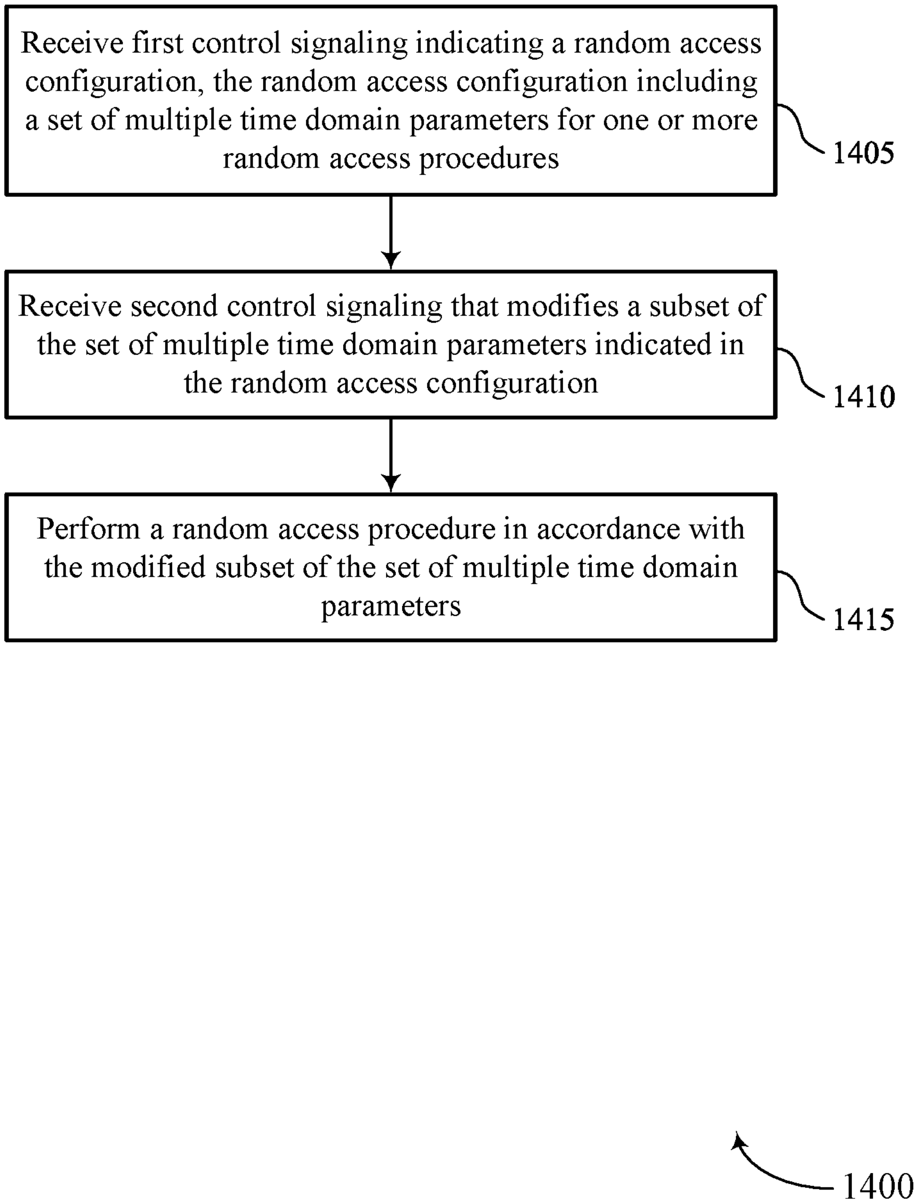
FIGS. 14 and 15 show flowcharts illustrating methods that support techniques for adapting random access time-domain parameters.

FIG. 14 shows a flowchart illustrating a method 1400 that supports techniques for adapting random access time-domain parameters. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving first control signaling indicating a random access configuration, the random access configuration including a set of multiple time-domain parameters for one or more random access procedures. The operations of 1405 may be performed in accordance with examples as disclosed herein. In some examples, aspects of the operations of 1405 may be performed by a configuration reception component 825 as described with reference to FIG. 8.

At 1410, the method may include receiving second control signaling that modifies a subset of the set of multiple time-domain parameters indicated in the random access configuration. The operations of 1410 may be performed in accordance with examples as disclosed herein. In some examples, aspects of the operations of 1410 may be performed by a configuration modification component 830 as described with reference to FIG. 8.

At 1415, the method may include performing a random access procedure in accordance with the modified subset of the set of multiple time-domain parameters. The operations of 1415 may be performed in accordance with examples as disclosed herein. In some examples, aspects of the operations of 1415 may be performed by a random access procedure component 835 as described with reference to FIG. 8.

Figure 15:
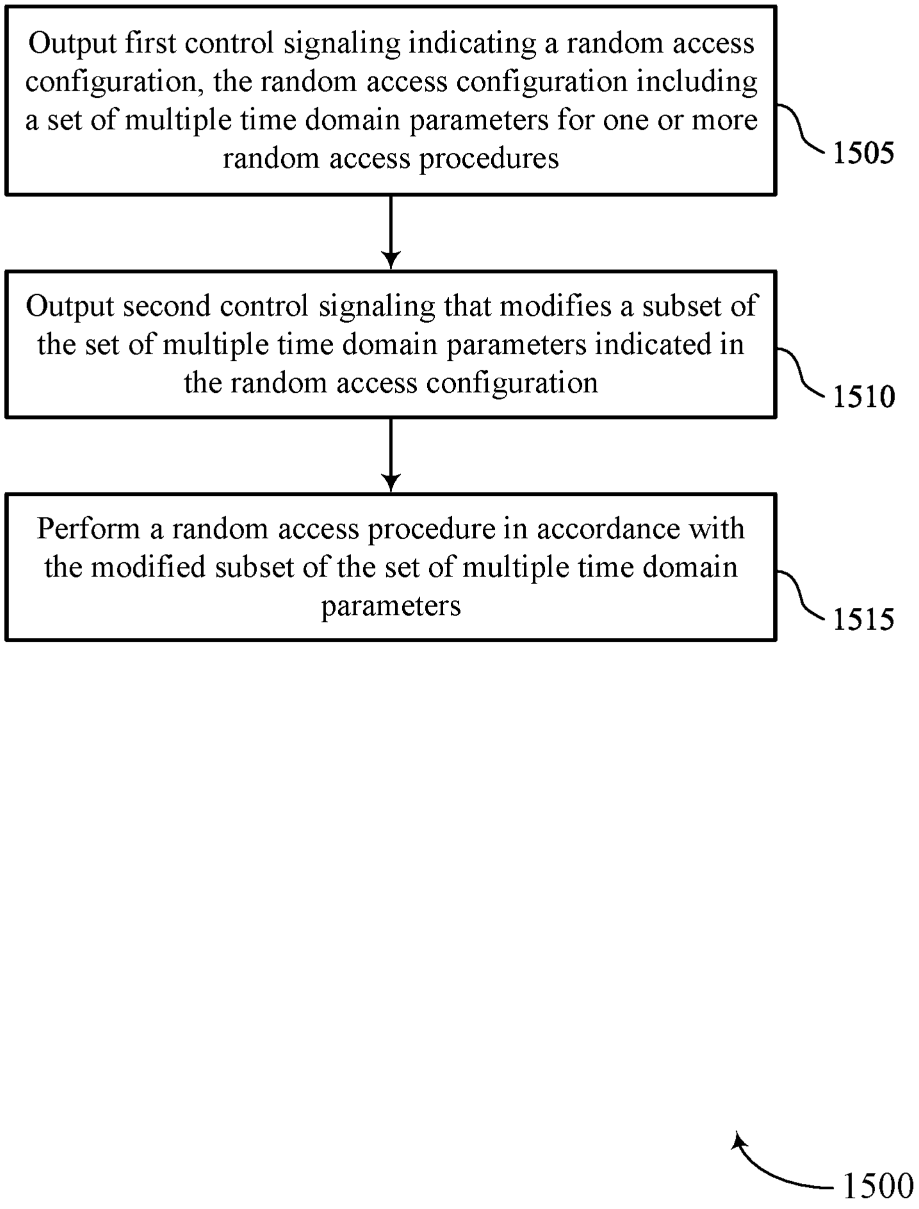

FIG. 15 shows a flowchart illustrating a method 1500 that supports techniques for adapting random access time-domain parameters. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include outputting first control signaling indicating a random access configuration, the random access configuration including a set of multiple time-domain parameters for one or more random access procedures. The operations of 1505 may be performed in accordance with examples as disclosed herein. In some examples, aspects of the operations of 1505 may be performed by a configuration output component 1225 as described with reference to FIG. 12.

At 1510, the method may include outputting second control signaling that modifies a subset of the set of multiple time-domain parameters indicated in the random access configuration. The operations of 1510 may be performed in accordance with examples as disclosed herein. In some examples, aspects of the operations of 1510 may be performed by a configuration modification component 1230 as described with reference to FIG. 12.

At 1515, the method may include performing a random access procedure in accordance with the modified subset of the set of multiple time-domain parameters. The operations of 1515 may be performed in accordance with examples as disclosed herein. In some examples, aspects of the operations of 1515 may be performed by a random access procedure component 1235 as described with reference to FIG. 12.

The following provides an overview of aspects of the present disclosure:

Aspect 1: A method for wireless communications at a UE, comprising: receiving first control signaling indicating a random access configuration, the random access configuration comprising a plurality of time domain parameters for one or more random access procedures; receiving second control signaling that modifies a subset of the plurality of time domain parameters indicated in the random access configuration; and performing a random access procedure in accordance with the modified subset of the plurality of time domain parameters.

Aspect 2: The method of aspect 1, wherein receiving the second control signaling comprises: receiving the second control signaling comprising an indication that one or more time domain resources for performing the one or more random access procedures indicated via the random access configuration are to be disregarded by the UE, wherein the random access procedure is performed via time domain resources that are different from the one or more time domain resources to be disregarded by the UE.

Aspect 3: The method of aspect 2, further comprising: receiving, via the second control signaling, an indication of a scaling factor associated with a random access resource periodicity indicated in the random access configuration, wherein the indication that the one or more time domain resources are to be disregarded is based at least in part on the scaling factor.

Aspect 4: The method of any of aspects 2 through 3, further comprising: receiving, via the second control signaling, an indication of a bitmap indicating one or more sub-frames in which the one or more time domain resources that are to be disregarded by the UE are located.

Aspect 5: The method of any of aspects 2 through 4, further comprising: receiving, via the second control signaling, an indication of one or more slots in which the one or more time domain resources that are to be disregarded by the UE are located.

Aspect 6: The method of any of aspects 2 through 5, further comprising: receiving, via the second control signaling, an indication of one or more random access occasions in which the one or more time domain resources that are to be disregarded by the UE are located.

Aspect 7: The method of any of aspects 2 through 6, wherein the one or more time domain resources that are to be disregarded by the UE comprise one or more random access slots that occur first in time in a special slot of a frame or one or more random access occasions that occur first in time in a random access slot of one of the one or more random access slots.

Aspect 8: The method of any of aspects 1 through 7, wherein receiving the second control signaling comprises: receiving the second control signaling comprising an indication of one or more additional time domain resources for performing the random access procedure relative to time domain resources indicated in the random access configuration, wherein the random access procedure is performed using at least one of the one or more additional time domain resources.

Aspect 9: The method of any of aspects 1 through 8, wherein receiving the second control signaling comprises: receiving the second control signaling comprising an indication of an additional random access configuration index corresponding to an additional random access configuration that corresponds to one or more modified values for the subset of the plurality of time domain parameters indicated in the random access configuration.

Aspect 10: The method of any of aspects 1 through 9, wherein receiving the second control signaling comprises: receiving the second control signaling comprising an indication of one or more modified values for the subset of the plurality of time domain parameters indicated in the random access configuration.

Aspect 11: The method of any of aspects 1 through 10, wherein the second control signaling comprises an indication of a scaling parameter applicable to a random access occasion periodicity parameter indicated via the random access configuration and a random access association periodicity parameter indicated via the random access configuration.

Aspect 12: The method of any of aspects 1 through 11, further comprising: receiving a plurality of additional random access configurations corresponding to a plurality of UE features, or a plurality of UE functionalities, or both; and receiving an indication of one or more of the plurality of additional random access configurations to which the modified subset of the plurality of time domain parameters is applicable.

Aspect 13: The method of aspect 12, wherein the indication of one or more of the plurality of additional random access configurations to which the modified subset is applicable comprises a bitmap; and respective bits of the bitmap are mapped to respective UE features of the plurality of UE features or respective UE functionalities of the plurality of UE functionalities.

Aspect 14: The method of any of aspects 1 through 13, wherein the subset of the plurality of time domain parameters comprises a periodicity parameter, a subframe number parameter, a quantity of random access slots within a subframe, a quantity of random access occasions within a random access slot, or any combination thereof.

Aspect 15: The method of any of aspects 1 through 14, wherein the first control signaling comprises system information block signaling or radio resource control signaling.

Aspect 16: The method of any of aspects 1 through 15, wherein the second control signaling comprises paging downlink control information signaling, paging message signaling, paging early indication signaling, downlink control information signaling, or scheduling downlink control information signaling.

Aspect 17: A method for wireless communications at a network entity, comprising: outputting first control signaling indicating a random access configuration, the random access configuration comprising a plurality of time domain parameters for one or more random access procedures; outputting second control signaling that modifies a subset of the plurality of time domain parameters indicated in the random access configuration; and performing a random access procedure in accordance with the modified subset of the plurality of time domain parameters.

Aspect 18: The method of aspect 17, wherein outputting the second control signaling comprises: outputting the second control signaling comprising an indication that one or more time domain resources for performing the one or more random access procedures indicated via the random access configuration are to be disregarded by the UE, wherein the random access procedure is performed via time domain resources that are different from the one or more time domain resources to be disregarded by the UE.

Aspect 19: The method of aspect 18, further comprising: outputting, via the second control signaling, an indication of a scaling factor associated with a random access resource periodicity indicated in the random access configuration, wherein the indication that the one or more time domain resources are to be disregarded is based at least in part on the scaling factor.

Aspect 20: The method of any of aspects 18 through 19, further comprising: outputting, via the second control signaling, an indication of a bitmap indicating one or more sub-frames in which the one or more time domain resources that are to be disregarded by the UE are located.

Aspect 21: The method of any of aspects 18 through 20, further comprising: outputting, via the second control signaling, an indication of one or more slots in which the one or more time domain resources that are to be disregarded by the UE are located.

Aspect 22: The method of any of aspects 18 through 21, further comprising: outputting, via the second control signaling, an indication of one or more random access occasions in which the one or more time domain resources that are to be disregarded by the UE are located.

Aspect 23: The method of any of aspects 18 through 22, wherein the one or more time domain resources that are to be disregarded by the UE comprise one or more random access slots that occur first in time in a special slot of a frame or one or more random access occasions that occur first in time in a random access slot of one of the one or more random access slots.

Aspect 24: The method of any of aspects 17 through 23, wherein outputting the second control signaling comprises: outputting the second control signaling comprising an indication of one or more additional time domain resources for performing the random access procedure relative to time domain resources indicated in the random access configuration, wherein the random access procedure is performed using at least one of the one or more additional time domain resources.

Aspect 25: The method of any of aspects 17 through 24, wherein outputting the second control signaling comprises: outputting the second control signaling comprising an indication of an additional random access configuration index corresponding to an additional random access configuration that corresponds to one or more modified values for the subset of the plurality of time domain parameters indicated in the random access configuration.

Aspect 26: The method of any of aspects 17 through 25, wherein outputting the second control signaling comprises: outputting the second control signaling comprising an indication of one or more modified values for the subset of the plurality of time domain parameters indicated in the random access configuration.

Aspect 27: The method of any of aspects 17 through 26, wherein the second control signaling comprises an indication of a scaling parameter applicable to a random access occasion periodicity parameter indicated via the random access configuration and a random access association periodicity parameter indicated via the random access configuration.

Aspect 28: The method of any of aspects 17 through 27, further comprising: outputting a plurality of additional random access configurations corresponding to a plurality of UE features, or a plurality of UE functionalities, or both; and outputting an indication of one or more of the plurality of additional random access configurations to which the modified subset of the plurality of time domain parameters is applicable.

Aspect 29: The method of aspect 28, wherein the indication of one or more of the plurality of additional random access configurations to which the modified subset is applicable comprises a bitmap; and respective bits of the bitmap are mapped to respective UE features of the plurality of UE features or respective UE functionalities of the plurality of UE functionalities.

Aspect 30: The method of any of aspects 17 through 29, wherein the subset of the plurality of time domain parameters comprises a periodicity parameter, a subframe number parameter, a quantity of random access slots within a subframe, a quantity of random access occasions within a random access slot, or any combination thereof.

Aspect 31: The method of any of aspects 17 through 30, wherein the first control signaling comprises system information block signaling or radio resource control signaling.

Aspect 32: The method of any of aspects 17 through 31, wherein the second control signaling comprises paging downlink control information signaling, paging message signaling, paging early indication signaling, downlink control information signaling, or scheduling downlink control information signaling.

Aspect 33: A UE for wireless communications, comprising one or more memories storing processor-executable code, and one or more processors coupled with the one or more memories and individually or collectively operable to execute the code to cause the UE to perform a method of any of aspects 1 through 16.

Aspect 34: A UE for wireless communications, comprising at least one means for performing a method of any of aspects 1 through 16.

Aspect 35: A non-transitory computer-readable medium storing code for wireless communications, the code comprising instructions executable by one or more processors to perform a method of any of aspects 1 through 16.

Aspect 36: A network entity for wireless communications, comprising one or more memories storing processor-executable code, and one or more processors coupled with the one or more memories and individually or collectively operable to execute the code to cause the network entity to perform a method of any of aspects 17 through 32.

Aspect 37: A network entity for wireless communications, comprising at least one means for performing a method of any of aspects 17 through 32.

Aspect 38: A non-transitory computer-readable medium storing code for wireless communications, the code comprising instructions executable by one or more processors to perform a method of any of aspects 17 through 32. It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive first control signaling indicating a random access configuration, the random access configuration comprising a plurality of time-domain parameters for one or more random access procedures;

receive second control signaling that modifies a subset of the plurality of time-domain parameters indicated in the random access configuration, wherein the second control signaling comprises an indication of one or more modified values for the subset of the plurality of time-domain parameters indicated in the random access configuration; and perform a random access procedure in accordance with the modified subset of the plurality of time-domain parameters.

2. The UE of claim 1, wherein, to receive the second control signaling, the one or more processors are individually or collectively operable to execute the code to cause the UE to:

receive the second control signaling comprising an indication that one or more time-domain resources for performing the one or more random access procedures indicated via the random access configuration are to be disregarded by the UE, wherein the random access procedure is performed via time-domain resources that are different from the one or more time-domain resources to be disregarded by the UE.

3. The UE of claim 2, wherein the one or more processors are individually or collectively further operable to execute the code to cause the UE to:

receive, via the second control signaling, an indication of a scaling factor associated with a random access resource periodicity indicated in the random access configuration, wherein the indication that the one or more time-domain resources are to be disregarded is based at least in part on the scaling factor.

4. The UE of claim 2, wherein the one or more processors are individually or collectively further operable to execute the code to cause the UE to:

receive, via the second control signaling, an indication of a bitmap indicating one or more sub-frames in which the one or more time-domain resources that are to be disregarded by the UE are located.

5. The UE of claim 2, wherein the one or more processors are individually or collectively further operable to execute the code to cause the UE to:

receive, via the second control signaling, an indication of one or more slots in which the one or more time-domain resources that are to be disregarded by the UE are located.

6. The UE of claim 2, wherein the one or more processors are individually or collectively further operable to execute the code to cause the UE to:

receive, via the second control signaling, an indication of one or more random access occasions in which the one or more time-domain resources that are to be disregarded by the UE are located.

7. The UE of claim 2, wherein the one or more time-domain resources that are to be disregarded by the UE comprise one or more random access slots that occur first in time in a special slot of a frame or one or more random access occasions that occur first in time in a random access slot of one of the one or more random access slots.

8. The UE of claim 1, wherein, to receive the second control signaling, the one or more processors are individually or collectively operable to execute the code to cause the UE to:

receive the second control signaling comprising an indication of one or more additional time-domain resources for performing the random access procedure relative to time-domain resources indicated in the random access configuration, wherein the random access procedure is performed using at least one of the one or more additional time-domain resources.

9. The UE of claim 1, wherein, to receive the second control signaling, the one or more processors are individually or collectively operable to execute the code to cause the UE to:

receive the second control signaling comprising an indication of an additional random access configuration index corresponding to an additional random access configuration that corresponds to one or more modified values for the subset of the plurality of time-domain parameters indicated in the random access configuration.

10. The UE of claim 1, wherein the second control signaling comprises an indication of a scaling parameter applicable to a random access occasion periodicity parameter indicated via the random access configuration and a random access association periodicity parameter indicated via the random access configuration.

11. The UE of claim 1, wherein the one or more processors are individually or collectively further operable to execute the code to cause the UE to:

receive a plurality of additional random access configurations corresponding to a plurality of UE features, or a plurality of UE functionalities, or both; and receive an indication of one or more of the plurality of additional random access configurations to which the modified subset of the plurality of time-domain parameters is applicable.

12. The UE of claim 11, wherein:

the indication of one or more of the plurality of additional random access configurations to which the modified subset is applicable comprises a bitmap; and respective bits of the bitmap are mapped to respective UE features of the plurality of UE features or respective UE functionalities of the plurality of UE functionalities.

13. The UE of claim 1, wherein the subset of the plurality of time-domain parameters comprises a periodicity parameter, a subframe number parameter, a quantity of random access slots within a subframe, a quantity of random access occasions within a random access slot, or any combination thereof.

14. The UE of claim 1, wherein:

the first control signaling comprises system information block signaling or radio resource control signaling.

15. The UE of claim 1, wherein:

the second control signaling comprises paging downlink control information signaling, paging message signaling, paging early indication signaling, downlink control information signaling, or scheduling downlink control information signaling.

16. A network entity, comprising:

one or more memories storing processor-executable code; and one or more processors coupled with the one or more memories and individually or collectively operable to execute the code to cause the network entity to:

output first control signaling indicating a random access configuration, the random access configuration comprising a plurality of time-domain parameters for one or more random access procedures;

output second control signaling that modifies a subset of the plurality of time-domain parameters indicated in the random access configuration, wherein the second control signaling comprises an indication of one or more modified values for the subset of the plurality of time-domain parameters indicated in the random access configuration; and perform a random access procedure in accordance with the modified subset of the plurality of time-domain parameters.

17. The network entity of claim 16, wherein, to output the second control signaling, the one or more processors are individually or collectively operable to execute the code to cause the network entity to:

output the second control signaling comprising an indication that one or more time-domain resources for performing the one or more random access procedures indicated via the random access configuration are to be disregarded by a user equipment (UE), wherein the random access procedure is performed via time-domain resources that are different from the one or more time-domain resources to be disregarded by the UE.

18. The network entity of claim 17, wherein the one or more processors are individually or collectively further operable to execute the code to cause the network entity to:

output, via the second control signaling, an indication of a scaling factor associated with a random access resource periodicity indicated in the random access configuration, wherein the indication that the one or more time-domain resources are to be disregarded is based at least in part on the scaling factor.

19. The network entity of claim 17, wherein the one or more processors are individually or collectively further operable to execute the code to cause the network entity to:

output, via the second control signaling, an indication of a bitmap indicating one or more sub-frames in which the one or more time-domain resources that are to be disregarded by the UE are located.

20. The network entity of claim 17, wherein the one or more processors are individually or collectively further operable to execute the code to cause the network entity to:

output, via the second control signaling, an indication of one or more slots in which the one or more time-domain resources that are to be disregarded by the UE are located.

21. The network entity of claim 17, wherein the one or more processors are individually or collectively further operable to execute the code to cause the network entity to:

output, via the second control signaling, an indication of one or more random access occasions in which the one or more time-domain resources that are to be disregarded by the UE are located.

22. The network entity of claim 17, wherein the one or more time-domain resources that are to be disregarded by the UE comprise one or more random access slots that occur first in time in a special slot of a frame or one or more random access occasions that occur first in time in a random access slot of one of the one or more random access slots.

23. The network entity of claim 16, wherein, to output the second control signaling, the one or more processors are individually or collectively operable to execute the code to cause the network entity to:

output the second control signaling comprising an indication of one or more additional time-domain resources for performing the random access procedure relative to time-domain resources indicated in the random access configuration, wherein the random access procedure is performed using at least one of the one or more additional time-domain resources.

24. The network entity of claim 16, wherein, to output the second control signaling, the one or more processors are individually or collectively operable to execute the code to cause the network entity to:

output the second control signaling comprising an indication of an additional random access configuration index corresponding to an additional random access configuration that corresponds to one or more modified values for the subset of the plurality of time-domain parameters indicated in the random access configuration.

25. The network entity of claim 16, wherein the second control signaling comprises an indication of a scaling parameter applicable to a random access occasion periodicity parameter indicated via the random access configuration and a random access association periodicity parameter indicated via the random access configuration.

26. The network entity of claim 16, wherein the one or more processors are individually or collectively further operable to execute the code to cause the network entity to:

output a plurality of additional random access configurations corresponding to a plurality of UE features, or a plurality of UE functionalities, or both; and output an indication of one or more of the plurality of additional random access configurations to which the modified subset of the plurality of time-domain parameters is applicable.

27. A method for wireless communications at a user equipment (UE), comprising:

receiving first control signaling indicating a random access configuration, the random access configuration comprising a plurality of time-domain parameters for one or more random access procedures;

receiving second control signaling that modifies a subset of the plurality of time-domain parameters indicated in the random access configuration, wherein the second control signaling comprises an indication that one or more time-domain resources for performing the one or more random access procedures indicated via the random access configuration are to be disregarded by the UE, wherein the random access procedure is performed via time-domain resources that are different from the one or more time-domain resources to be disregarded by the UE; and performing a random access procedure in accordance with the modified subset of the plurality of time-domain parameters.

28. A method for wireless communications at a network entity, comprising:

outputting first control signaling indicating a random access configuration, the random access configuration comprising a plurality of time-domain parameters for one or more random access procedures;

outputting second control signaling that modifies a subset of the plurality of time-domain parameters indicated in the random access configuration, wherein the second control signaling comprises an indication that one or more time-domain resources for performing the one or more random access procedures indicated via the random access configuration are to be disregarded by a user equipment (UE), wherein the random access procedure is performed via time-domain resources that are different from the one or more time-domain resources to be disregarded by the UE; and performing a random access procedure in accordance with the modified subset of the plurality of time-domain parameters.

* * * * *